US011960225B2

(12) United States Patent
Yamaguchi et al.

(10) Patent No.: US 11,960,225 B2
(45) Date of Patent: Apr. 16, 2024

(54) IMAGE FORMING APPARATUS

(71) Applicant: CANON KABUSHIKI KAISHA, Tokyo (JP)

(72) Inventors: Koji Yamaguchi, Shizuoka (JP); Kohei Matsuda, Kanagawa (JP); Hiroki Ogino, Shizuoka (JP); Yasushi Katsuta, Tokyo (JP); Kaori Noguchi, Shizuoka (JP); Junko Hirata, Shizuoka (JP); Akira Kuroda, Shizuoka (JP); Yuki Nishizawa, Kanagawa (JP); Tsutomu Shimano, Shizuoka (JP); Toru Oguma, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/742,470

(22) Filed: May 12, 2022

(65) Prior Publication Data

US 2022/0269201 A1 Aug. 25, 2022

Related U.S. Application Data

(63) Continuation of application No. 17/118,948, filed on Dec. 11, 2020, now Pat. No. 11,360,416.

(30) Foreign Application Priority Data

Dec. 24, 2019 (JP) ................................ 2019-233018
Jul. 31, 2020 (JP) ................................ 2020-129964

(51) Int. Cl.

*G03G 15/20* (2006.01)
*G03G 15/00* (2006.01)

(52) U.S. Cl.

CPC ..... *G03G 15/2053* (2013.01); *G03G 15/6582* (2013.01)

(58) Field of Classification Search

CPC ........... G03G 15/6582; G03G 15/6585; G03G 2215/00789; G03G 2215/00822; G03G 2215/00835

See application file for complete search history.

(56) References Cited

U.S. PATENT DOCUMENTS

| | | | | |
|---|---|---|---|---|
| 6,037,040 | A | 3/2000 | Ohi et al. | |
| 7,260,354 | B2 | 8/2007 | Ishida | |
| 8,086,160 | B2 | 12/2011 | Nishizawa et al. | |
| 11,360,416 | B2 * | 6/2022 | Yamaguchi | G03G 21/1604 |
| 2006/0133871 | A1 | 6/2006 | Ishida | |

(Continued)

FOREIGN PATENT DOCUMENTS

| | | | |
|---|---|---|---|
| JP | 2006-171607 | A | 6/2006 |
| JP | 2007-193004 | A | 8/2007 |

*Primary Examiner* — Thomas S Giampaolo, II
(74) *Attorney, Agent, or Firm* — VENABLE LLP

(57) ABSTRACT

An image forming apparatus includes, an image forming portion configured to form a toner image on a sheet using printing toner and apply powder adhesive on the sheet, a fixing portion configured to heat the toner image formed on the sheet and the powder adhesive applied on the sheet by the image forming portion and fix the toner image and the powder adhesive to the sheet, and a bonding portion configured to bond the sheet with the powder adhesive by reheating the sheet having been heated by the fixing portion. The bonding portion is arranged above the image forming portion.

13 Claims, 11 Drawing Sheets

(56) References Cited

U.S. PATENT DOCUMENTS

| | | | | |
|---|---|---|---|---|
| 2007/0237556 | A1* | 10/2007 | Sakaguchi ......... | G03G 15/2053 399/341 |
| 2017/0343939 | A1* | 11/2017 | Yamaguchi ........ | G03G 15/2028 |

* cited by examiner

IMAGE FORMING APPARATUS

This application is a continuation of application Ser. No. 17/118,948, filed Dec. 11, 2020.

BACKGROUND OF THE INVENTION

Field of the Invention

The present invention relates to an image forming apparatus for forming an image on a sheet.

Description of the Related Art

Hitherto, in order to create a confidential document that requires sealing, such as a salary payment statement (also called as salary slip or payslip), a pre-printed sheet is prepared in advance, and variable data is printed to each pre-printed sheet, before the sheet is subjected to a sealing process performed as postprocessing. According to this method, the creation of pre-printed sheets requires much time because it requires printing of a format, such as ruled lines, and the application of adhesive, and the creation of small quantities of confidential documents leads to high costs and low efficiency.

Japanese Patent Application Laid-Open Publication Nos. 2006-171607 and 2007-193004 teach an image forming apparatus that uses powder adhesive in addition to printing toner to execute an electrophotographic process to output a sealed printed product, thereby enabling to omit the step of preparing pre-printed sheets. In the disclosed apparatuses, printing toner and powder adhesive are transferred to a sheet, the transferred toner is fixed to the sheet by heat, and then the sheet is folded before the sheet is heated again and pressed to carry out a bonding process.

According to the image forming apparatuses disclosed in the documents mentioned above, downsizing of the apparatus was insufficient in a configuration where both a heating device, i.e., fixing unit, for fixing the printed image and a heating device, i.e., bonding unit, for carrying out the bonding process are provided.

SUMMARY OF THE INVENTION

The present invention provides an image forming apparatus that can be downsized sufficiently.

According to one aspect of the invention, an image forming apparatus includes, an image forming portion configured to form a toner image on a sheet using printing toner and apply powder adhesive on the sheet, a fixing portion configured to heat the toner image formed on the sheet and the powder adhesive applied on the sheet by the image forming portion and fix the toner image and the powder adhesive to the sheet, and a bonding portion configured to bond the sheet with the powder adhesive by reheating the sheet having been heated by the fixing portion. The bonding portion is arranged above the image forming portion.

According to another aspect of the invention, an image forming apparatus includes, an image forming portion configured to form a toner image on a sheet using printing toner and apply powder adhesive on the sheet, a fixing portion configured to heat the toner image formed on the sheet and the powder adhesive applied on the sheet by the image forming portion and fix the toner image and the powder adhesive to the sheet, a folding portion configured to fold the sheet having passed the fixing portion, a bonding portion configured to bond the sheet having been folded by the folding portion with the powder adhesive by reheating the sheet, a first tray to which a sheet not passing the bonding portion is discharged, and a second tray to which the sheet bonded by the bonding portion is discharged. The first tray and the second tray are arranged at a position upper than the image forming portion.

According to still another aspect of the invention, an image forming apparatus includes, a first storage portion configured to store printing toner, a second storage portion configured to store powder adhesive, an image forming portion configured to form a toner image on a sheet using printing toner and apply powder adhesive on the sheet, a fixing portion configured to fix the toner image formed by the image forming portion by heating the toner image, a folding portion configured to fold the sheet having passed the fixing portion, and a bonding portion configured to bond the sheet having been folded by the folding portion with the powder adhesive by reheating the sheet. With respect to a vertical direction, a bottom portion of the second storage portion is positioned lower than a lower end portion of the fixing portion and a lower end portion of the bonding portion.

Further features of the present invention will become apparent from the following description of exemplary embodiments with reference to the attached drawings.

DESCRIPTION OF THE EMBODIMENTS

Now, exemplary embodiments of the present invention will be described with reference to the drawings.

First Embodiment

Entire Configuration of Apparatus

Figure 1:
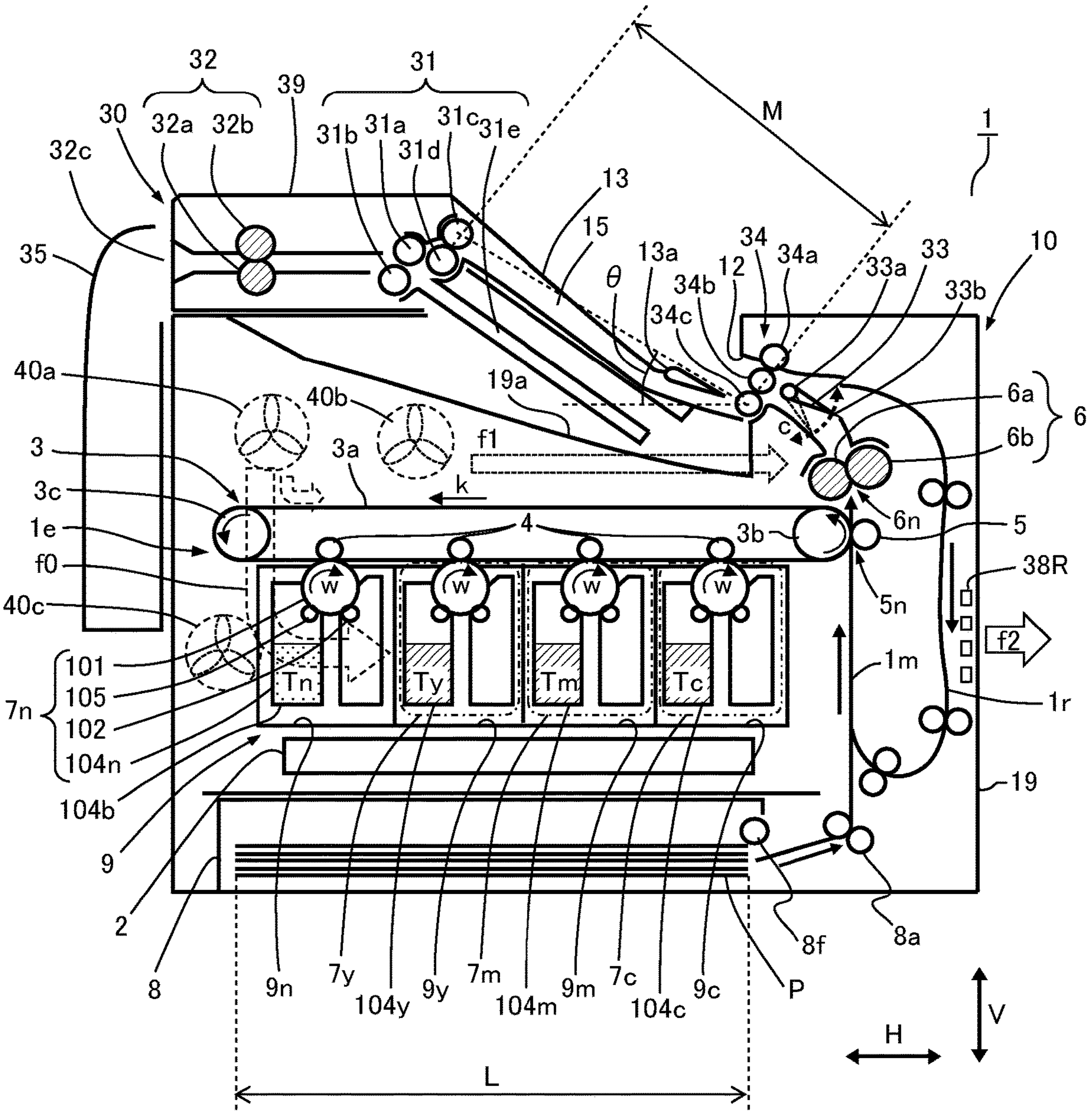
FIG. 1 is a schematic drawing of an image forming apparatus according to a first embodiment.

First, the entire configuration of the image forming apparatus will be described with reference to FIGS. 1, 2 and 6. FIG. 1 is a schematic drawing illustrating a sectional configuration of an image forming apparatus 1 including a main body of the image forming apparatus according to the first embodiment, hereinafter referred to as an apparatus body 10, and a postprocessing unit 30 connected to the apparatus body 10. The image forming apparatus 1 is an electrophotographic image forming apparatus, i.e., an electrophotographic system, composed of the apparatus body 10 having a printing function adopting an electrophotographic system and the postprocessing unit 30 serving as a sheet processing apparatus.

Figure 6:
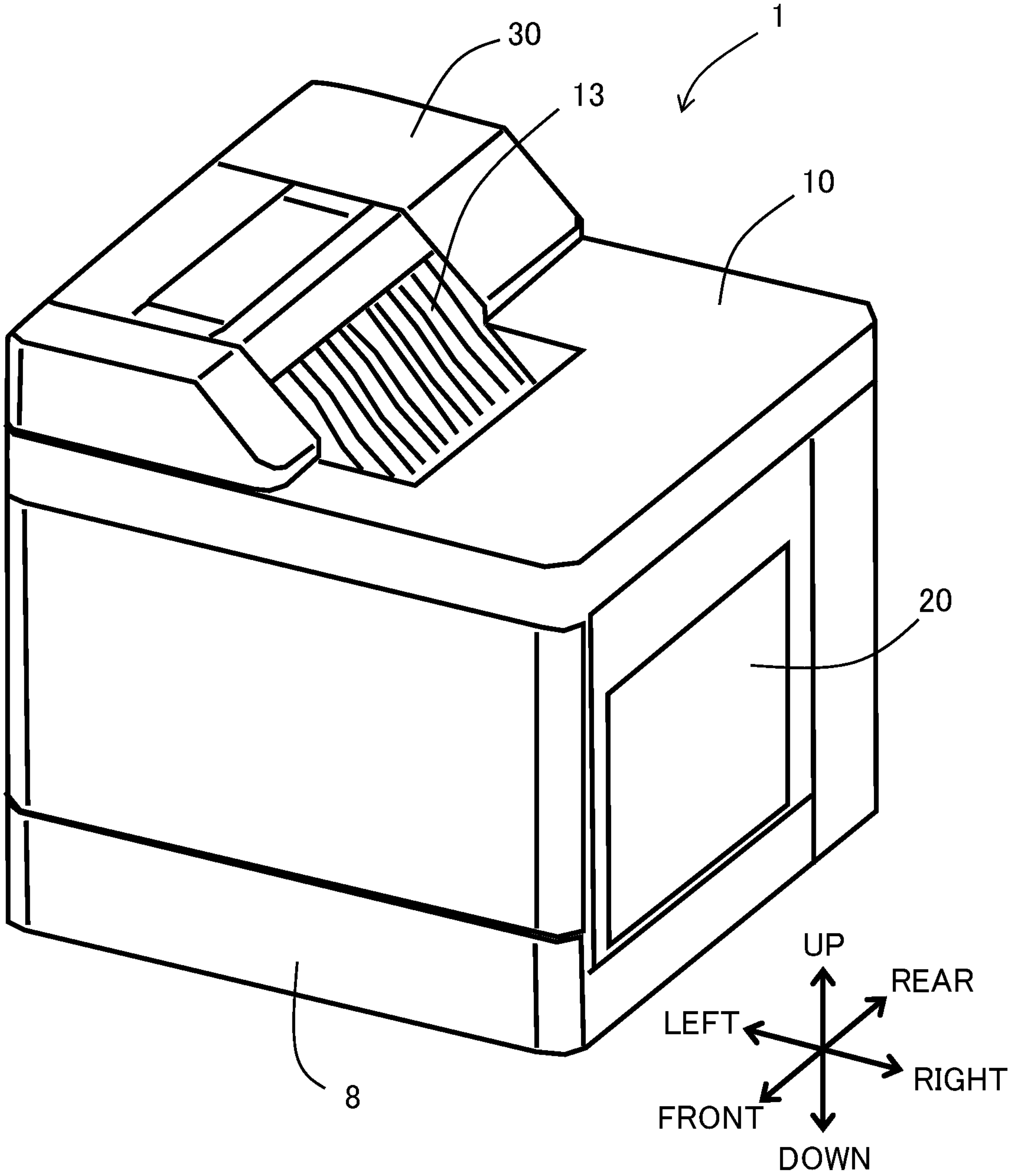
FIG. 6 is a perspective view illustrating an appearance of the image forming apparatus according to the first embodiment.

FIG. 6 is a perspective view illustrating an outer appearance of the image forming apparatus 1. The postprocessing unit 30 is attached to an upper portion of the apparatus body 10. The image forming apparatus 1 includes a sheet cassette 8 arranged at a lower portion, a tray 20 that can be opened and closed arranged at a right side portion, and a first sheet discharge tray 13 arranged at an upper face portion.

At first, an internal configuration of the apparatus body 10 will be described. As illustrated in FIG. 1, the apparatus body 10 includes the sheet cassette 8 serving as a sheet storage portion that stores sheets P serving as recording media, an image forming unit 1*e* serving as an image forming portion, a first fixing unit 6 serving as a fixing portion, and a casing 19 housing these components. The apparatus body 10 has a printing function of forming a toner image by the image forming unit 1*e* on the sheet P being fed from the sheet cassette 8 and subjecting the sheet P to a fixing process by the first fixing unit 6 to create a printed matter. Paper can be used as an example of the sheet P serving as the recording medium.

The sheet cassette 8 is inserted in a drawable manner to the casing 19 at a lower part of the apparatus body 10, and stores multiple sheets P. The sheets P stored in the sheet cassette 8 are fed from the sheet cassette 8 by a feeding member such as a feed roller 8*f*, and one of the sheets P is separated from other sheets by a separation roller pair and conveyed by a conveyance roller 8*a*. Further, it is also possible to feed sheets that are set on the tray 20 arranged in an opened state (FIG. 6).

The image forming unit 1*e* is a tandem-type electrophotographic unit including four processing cartridges 7*n*, 7*y*, 7*m* and 7*c*, a scanner unit 2 and a transfer unit 3. A processing cartridge is a unit that includes a plurality of components carrying out an image forming process, which can be replaced integrally. A cartridge supporting portion 9 that can be supported in the casing 19 is provided on the apparatus body 10, and the respective processing cartridges 7*n*, 7*y*, 7*m* and 7*c* are detachably attached to attachment portions 9*n*, 9*y*, 9*m* and 9*c* provided on the cartridge supporting portion 9. The cartridge supporting portion 9 may also be a tray member that can be drawn out of the casing 19.

The processing cartridges 7*n*, 7*y*, 7*m* and 7*c* have approximately the same configuration, except for the different types of powder material stored in the four powder storage portions 104*n*, 104*y*, 104*m* and 104*c*. That is, each of the processing cartridges 7*n*, 7*y*, 7*m* and 7*c* include a photosensitive drum 101 serving as an image bearing member, a charge roller 102 serving as a charger, one of powder storage portions 104*n*, 104*y*, 104*m* and 104*c* storing powder material, and a developing roller 105 that develops image using the powder material.

Among the four powder storage portions, three powder storage portions 104*y*, 104*m* and 104*c* arranged on the right side in the drawing store printing toner Ty, Tm and Tc of yellow, magenta and cyan as toner, i.e., powder developer, for forming a visible image on the sheet P. Meanwhile, the powder storage portion 104*n* on the leftmost side in the drawing stores the powder adhesive Tn which is powder material for performing a bonding process after the printing process. The powder storage portions 104*y*, 104*m* and 104*c* are each an example of a first storage portion storing printing toner, and the powder storage portion 104*n* is an example of a second storage portion storing powder adhesive. Further, the processing cartridges 7*y*, 7*m* and 7*c* are each an example of a first processing unit for forming a toner image using printing toner, and a processing cartridge 7*n* is an example of a second processing unit for forming an image of powder adhesive according to a predetermined application pattern.

According to the present embodiment, in order to print a black image such as a text image, process black in which color toner of yellow (Ty), magenta (Tm) and cyan (Tc) are superposed to create black is used. However, it is possible to add a fifth processing cartridge containing black printing toner to the image forming unit 1*e* and enable a black image to be formed using black printing toner. The types and number of printing toner can be varied according to the purpose of use of the image forming apparatus 1.

The scanner unit 2 is arranged below the processing cartridges 7*n*, 7*y*, 7*m* and 7*c* and above the sheet cassette 8. The scanner unit 2 is an exposure unit of the present embodiment that emits laser light G to the photosensitive drum 101 of respective processing cartridges 7*n*, 7*y*, 7*m* and 7*c* to form an electrostatic latent image.

The transfer unit 3 is equipped with a transfer belt 3*a* that serves as an intermediate transfer body, i.e., secondary image bearing member. The transfer belt 3*a* is a belt member wound around a secondary transfer inner roller 3*b* and a tension roller 3*c*, and an outer peripheral surface of the transfer belt 3*a* opposes the photosensitive drums 101 of the respective processing cartridges 7*n*, 7*y*, 7*m* and 7*c*. Primary transfer rollers 4 are arranged at positions corresponding to respective photosensitive drums 101 on the inner peripheral side of the transfer belt 3*a*. Further, a secondary transfer roller 5 serving as a transfer member is arranged at a position opposed to the secondary transfer inner roller 3*b*. A transfer nip 5*n* formed between the secondary transfer roller 5 and the transfer belt 3*a* is a transfer portion, i.e., secondary transfer portion, where toner image is transferred from the transfer belt 3*a* to the sheet P.

The first fixing unit 6 is arranged above the secondary transfer roller 5. The first fixing unit 6 is a fixing unit that adopts a heat fixing system, including a heating roller 6*a* serving as a fixing member and a pressing roller 6*b* serving as a pressing member. The heating roller 6*a* is heated by a heat generating mechanism that adopts a heater such as a halogen lamp or a ceramic heater or an induction heating device. The pressing roller 6*b* is pressed against the heating roller 6*a* by an urging member such as a spring, that generates pressure for pressing a sheet P that passes a nip potion, that is, a fixing nip 6*n*, formed between the heating roller 6*a* and the pressing roller 6*b*. A configuration in which a roller pair serving as a rotary member pair nips and conveys sheets has been illustrated, but other configurations can be adopted, such as a configuration where a heater is arranged on an inner side of tubular film, and the sheet is nipped and conveyed by the nip portion formed between the heater and a pressure roller that opposes to the heater with a film interposed therebetween.

A sheet discharge port 12, i.e., first sheet discharge port, serving as an opening portion for discharging the sheet P from the apparatus body 10 is formed on the casing 19, and a sheet discharge unit 34 is arranged at the sheet discharge port 12. The sheet discharge unit 34 serving as a sheet discharge portion according to the present embodiment adopts a so-called triple roller composed of a first sheet discharge roller 34*a*, an intermediate roller 34*b* and a second sheet discharge roller 34*c*. Further, a switching guide 33 which is a flap-shaped guide that switches the conveyance route of the sheet P is provided between the first fixing unit 6 and the sheet discharge unit 34. The switching guide 33 is pivotable around a shaft portion 33*a* such that a tip 33*b* of the switching guide 33 moves back and forth in a direction of arrow c in the drawing.

The apparatus body 10 is equipped with a mechanism for performing duplex printing. A motor not shown is connected to the sheet discharge unit 34 for rotating the intermediate roller 34*b* in both a normal direction and a reverse direction. A duplex conveyance path 1*r* that serves as a conveyance path connected in a loop to a main conveyance path 1*m* is provided. The sheet P having an image formed on a first side (i.e., first surface) while passing the main conveyance path 1*m* is nipped and conveyed by the first sheet discharge roller 34*a* and the intermediate roller 34*b* via the switching guide 33 pivoted in a clockwise direction, the position of which is shown by a dashed line. After a trailing edge of the sheet P in a feed direction passes the switching guide 33, the switching guide 33 pivots in a counterclockwise direction, the position of which is shown by a solid line, and the rotation of the intermediate roller 34*b* is reversed, by which the sheet P is conveyed in a reverse manner to the duplex conveyance path 1*r*. That is, the first sheet discharge roller 34*a* and the intermediate roller 34*b* function as a reverse unit for reversing the sheet having an image formed on a first side and reconveying the sheet toward the image forming unit 1*e*. While the sheet P having the upper and lower sides reversed passes the main conveyance path 1*m* again, an image is formed on a second side (i.e., second surface) opposite to the first side of the sheet P. When the trailing edge of the sheet P in the feed direction passes the switching guide 33, a leading edge of the sheet P in the feed direction is exposed to the exterior of the apparatus. The conveyance route of the sheet P after performing duplex printing is switched by the switching guide 33, similar to the case of a simplex printing.

The image forming apparatus according to the present embodiment can execute alternate feeding using the duplex conveyance path 1*r* in a case where duplex printing is executed to a plurality of sheets P. That is, after an image is formed to a first side of a preceding sheet, the preceding sheet stands by in the duplex conveyance path 1*r* while an image is formed to a first side of a succeeding sheet, and thereafter, an image is formed to a second side of the preceding sheet. However, alternate feeding is not executed in the case of a medicine envelope and the like where an image is formed using printing toner on a surface, i.e., first side, of a product and powder adhesive is applied to an inner side, i.e., second side, of the product. In that case, an operation of sequentially forming the image on the first side of the sheet, i.e., recording of image, and an operation of forming the image on the second side of the same sheet, i.e., application of powder adhesive, are repeated.

The conveyance route that passes the conveyance roller 8*a*, a transfer nip 5N and a fixing nip 6N in the apparatus body 10 constitutes the main conveyance path 1*m* through which an image is formed on the sheet P. The main conveyance path 1*m* extends from a position lower than a position upper than the image forming unit 1*e* through one side in a horizontal direction H when viewed in a main scanning direction of forming an image, that is, a width direction of the sheet perpendicular to a conveyance direction of the sheet conveyed in the main conveyance path 1*m*. In other words, the apparatus body 10 according to the present embodiment is a so-called vertical conveyance-type, also referred to as vertical path-type or C-path type, electrophotographic image forming apparatus in which the main conveyance path 1*m* extends in an approximately vertical direction V. When viewed in the vertical direction V, i.e., in the gravity direction, the first sheet discharge tray 13, an intermediate path 15 and the sheet cassette 8 are mutually overlapped. Therefore, the direction of movement of the sheet with respect to the horizontal direction H when the sheet discharge unit 34 discharges the sheet P is opposite to the direction of movement of the sheet with respect to the horizontal direction H when the sheet P is fed from the sheet cassette 8.

Postprocessing Unit

Figure 2:
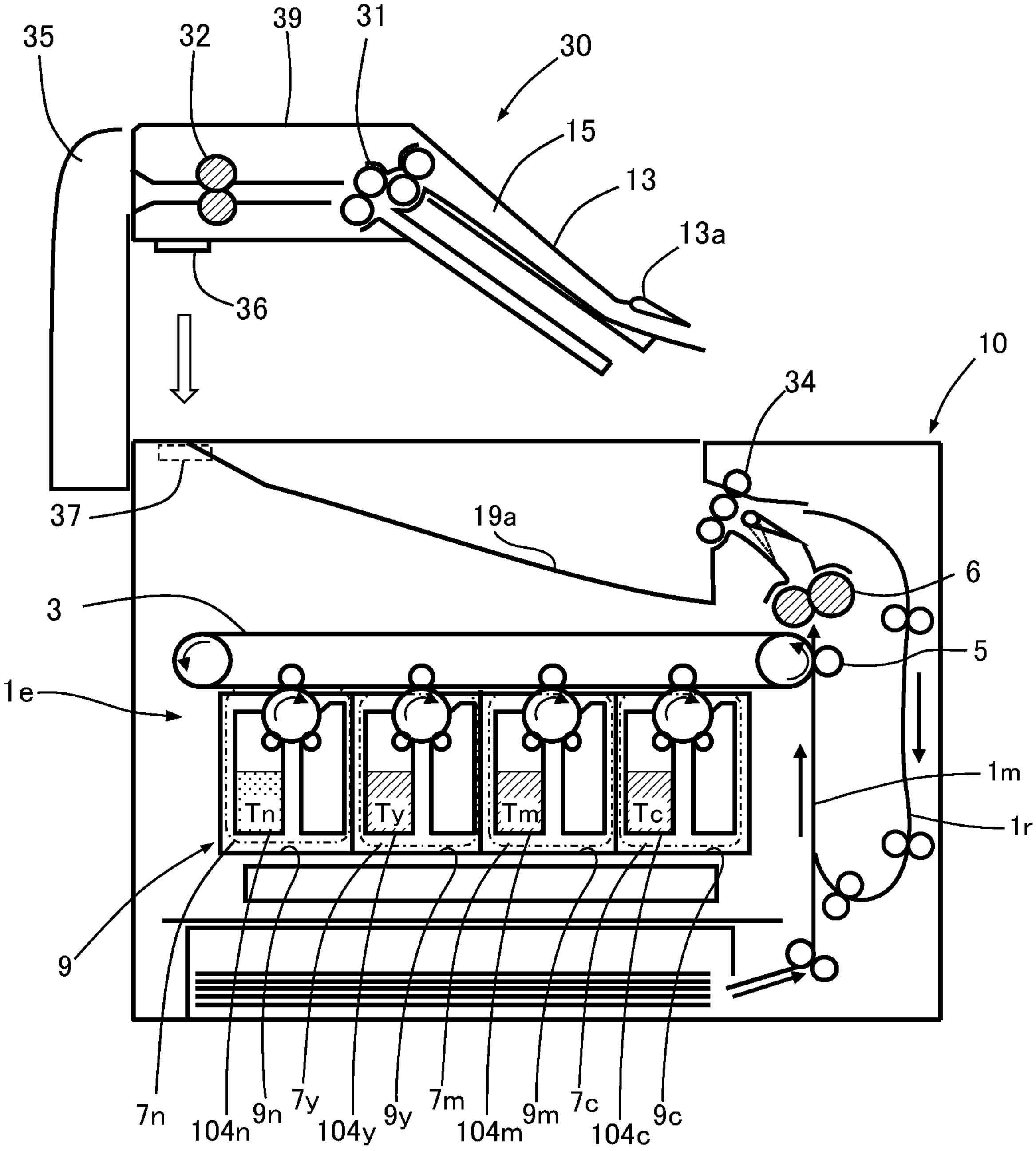
FIG. 2 is a view illustrating an attachment/detachment of a postprocessing unit with respect to an apparatus body of the image forming apparatus according to the first embodiment.

As illustrated in FIG. 2, the postprocessing unit 30 is attached to the upper portion of the apparatus body 10. The postprocessing unit 30 is a postprocessing unit in which a folding unit 31 serving as a folding portion and a second fixing unit 32 serving as a bonding portion, i.e., second fixing unit, are housed integrally in a casing, i.e., second casing, 39. The postprocessing unit 30 includes the first sheet discharge tray 13 that rotatably retains a tray switch guide 13*a*, the intermediate path 15, and a second sheet discharge tray 35 serving as a second tray. The first sheet discharge tray 13 serving as a first tray is provided on an upper surface of the postprocessing unit 30 and positioned on an upper surface of the whole image forming apparatus 1 (FIG. 1). The functions of respective units of the postprocessing unit 30 will be described later.

As described above, according to the present embodiment, the folding unit 31 serving as a folding portion and the second fixing unit 32 as a bonding portion are arranged above the image forming unit 1*e* serving as an image forming portion. Therefore, a second fixing unit, i.e., second heating device, that differs from the first fixing unit 6, i.e., first heating device, can be arranged in the space above the image forming unit 1*e*, which is a relatively large space in the electrophotographic image forming apparatus. Therefore, according to the present embodiment, the image forming apparatus 1 having two or more heating devices can be downsized sufficiently.

According to the present embodiment, a C-shaped conveyance route that passes three sides, that is, lower side, right side of FIG. 1 and upper side, of the image forming unit 1*e* in the viewpoint of FIG. 1, i.e., viewed in the main scanning direction during image forming, is formed as a conveyance route for conveying the sheet P and outputting a printed-and-bonded product mentioned later. That is, the sheet P stored below the image forming unit 1*e* is sent out to one side, that is, right side of FIG. 1, in the horizontal direction H by the feed roller 8*f* The sheet P having passed the first fixing unit 6 is conveyed to the other side, i.e., left side of FIG. 1, in the horizontal direction H by the sheet discharge unit 34 serving as the conveyance member. According to this configuration, the first fixing unit 6 is arranged on the sheet conveyance route, i.e., the main conveyance path 1*m*, that extends from the feed roller 8*f* toward the sheet discharge unit 34 at one side in the horizontal direction of the image forming unit 1*e*. The second fixing unit 32 is arranged on the sheet conveyance route that extends from the sheet discharge unit 34 via the folding unit 31 to the other side in the horizontal direction H above the image forming unit 1*e*.

As described, by providing the C-shaped conveyance route and arranging the first fixing unit 6, the folding unit 31 and the second fixing unit 32 along the conveyance route, a specific configuration where the image forming apparatus 1 is sufficiently downsized can be realized. The actual operation for outputting the printed-and-bonded product will be described with reference to FIG. 4B. The conveyance route is not limited to a C-shaped conveyance route, and for example, an S-shaped conveyance route can be formed.

Specifically, in the viewpoint of FIG. 1, that is, when viewed in the main scanning direction for forming the image, an occupation range in the horizontal direction H of a main portion, that is, the folding unit 31 and the second fixing unit 32, excluding the second sheet discharge tray 35 of the postprocessing unit 30, should preferably fit within the occupation range of the apparatus body 10. By providing the postprocessing unit 30 fit within the space on the upper side of the apparatus body 10, i.e., the space above the apparatus body, the image forming apparatus 1 having a print-and-bond function can be installed in an equivalent installation space as a normal vertical path-type electrophotographic image forming apparatus.

A positioning portion, such as a projected shape that fits to a recess portion on the casing 19, for positioning the casing 39 on the casing 19, i.e., first casing, of the apparatus body 10 is provided in the postprocessing unit 30. Further, a drive source and a control unit that differ from those of the apparatus body 10 are provided on the postprocessing unit 30, and by coupling a connector 36 of the postprocessing unit 30 to a connector 37 of the apparatus body 10, the postprocessing unit 30 can be electrically connected to the apparatus body 10. Thereby, the postprocessing unit 30 will operate based on a command from a control unit provided in the apparatus body 10 using power supplied through the apparatus body 10.

Processing Cartridge

Figure 8:
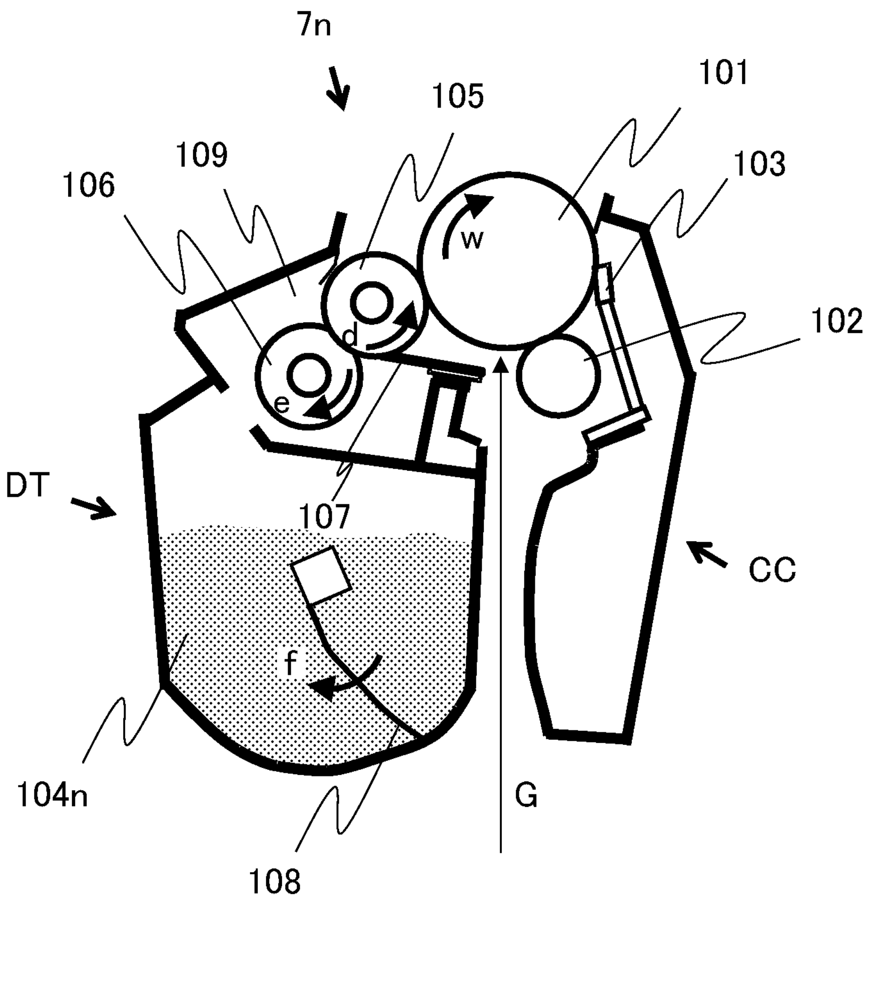
FIG. 8 is a schematic drawing of a processing cartridge according to the first embodiment.

The processing cartridges 7*n*, 7*y*, 7*m* and 7*c* have approximately common configurations except for the type of powder material stored in the four powder storage portions 104*n*, 104*y*, 104*m* and 104*c*, as mentioned earlier. The processing cartridge 7*n* will be described here as an example. FIG. 8 is a cross-sectional view illustrating a schematic configuration of the processing cartridge 7*n*. The processing cartridge 7*n* is composed of a photoreceptor unit CC including the photosensitive drum 101 and a developing unit DT including the developing roller 105.

The photosensitive drum 101 serving as an electrophotographic photoreceptor, i.e., image bearing member, formed in a drum shape is attached rotatably via a bearing not shown to the photoreceptor unit CC. Further, the photosensitive drum 101 is driven to rotate in a clockwise direction (arrow w) in the drawing during image forming operation by receiving the driving force of a motor serving as a driving unit, i.e., drive source, not shown. Further, the charge roller 102 for charging the photosensitive drum 101 and a cleaning member 103 are arranged on the circumference of the photosensitive drum 101 in the photoreceptor unit CC.

The developing roller 105 serving as a developer bearing member that contacts the photosensitive drum 101 and rotates in the counterclockwise direction (arrow d) is provided in the developing unit DT. The developing roller 105 and the photosensitive drum 101 are rotated so that their surfaces are moved in the same direction at the opposing portion, i.e., contact portion.

Further, a developer feed roller, hereinafter simply referred to as "feed roller 106", that serves as a developer supply member that rotates in the clockwise direction (arrow e) in the drawing is provided in the developing unit DT. The feed roller 106 and the developing roller 105 are rotated so that their surfaces move in the same direction at the opposing portion, i.e., contact portion. The feed roller 106 feeds the powder adhesive, or the printing toner in the case of processing cartridges 7*y*, 7*m* and 7*c*, to the developing roller 105. At the same time, the feed roller 106 functions to scrape off the powder adhesive, or the printing toner in the case of the processing cartridges 7*y*, 7*m* and 7*c*, remaining on the developing roller 105 from the developing roller 105. Further, a developer blade 107 serving as a developer regulation member for regulating layer thickness of the powder adhesive, or the printing toner in the case of the processing cartridges 7*y*, 7*m* and 7*c*, supplied on the developing roller 105 by the feed roller 106 is provided in the developing unit DT.

The powder adhesive, or the printing toner in the case of the processing cartridges 7*y*, 7*m* and 7*c*, is stored as powder material in the powder storage portion 104*n*. Further, a conveying member 108 which is supported rotatably is provided in the powder storage portion 104*n*. The conveying member 108 rotates in the clockwise direction (arrow f) in the drawing to agitate the powder stored in the powder storage portion 104*n* and convey the powder to a developing chamber 109 including the developing roller 105 and the feed roller 106.

It is also possible to design the photoreceptor unit CC and the developing unit DT separately as a photoreceptor unit cartridge and a developing unit cartridge, that can be detachably attached to the image forming apparatus body. Further, it is also possible to provide the powder storage portion 104*n* and the conveying member 108 as a powder cartridge that can be detachably attached to the apparatus body separately from the processing cartridge including the photoreceptor and the developer bearing member.

Printing Toner

Conventionally known printing toner can be used as printing toner Tm, Tc and Ty according to the present embodiment. Among such toner, a printing toner that uses thermoplastic resin as binder resin is preferable. The thermoplastic resin is not specifically limited to a certain type of resin, and any type of thermoplastic resin that have been used conventionally as printing toner, such as polyester resin, vinyl resin, acrylic resin and styrene-acrylic resin can be used. The toner can contain a plurality of such resins. Specifically, a printing toner using styrene-acrylic resin is preferable. The printing toner, i.e., printing developer, can contain a coloring agent, a magnetic body, a charge control agent, a wax and an external additive.

Powder Adhesive

A powder adhesive containing thermoplastic resin can be used as the powder adhesive Tn according to the present embodiment. The thermoplastic resin is not specifically limited, and known thermoplastic resin such as polyester resin, vinyl resin, acrylic resin, styrene-acrylic resin, polyethylene, polypropylene, polyolefin, ethylene-vinyl acetate copolymer resin and ethylene-acrylic acid copolymer resin can be used. The powder adhesive can also include a plurality of these resins.

The powder adhesive Tn should preferably further include wax. A known wax, such as ester wax which is an ester including alcohol and acid or a hydrocarbon wax such as paraffin wax, can be used.

The powder adhesive Tn can contain a coloring agent. Known coloring agents such as black coloring agent, yellow coloring agent, magenta coloring agent and cyan coloring agent can be used. The content of the coloring agent within the powder adhesive should preferably be 1.0 wt. % or less, and more preferably, 0.1 wt. % or less. The powder adhesive Tn can contain a magnetic body, a charge control agent, a wax or an external additive.

In order to configure a bonding portion using powder adhesive on the sheet P using the electrophotographic system, weight-average particle diameter of the powder adhesive Tn should preferably be 5.0 μm or more and 30 μm or less, and more preferably 6.0 μm or more and 20 μm or less. A printing toner can also be used as the powder adhesive Tn, as long as it satisfies the required adhesive property.

Example of Preparation of Powder Adhesive

An example of a method for preparing the powder adhesive Tn will be described. At first, the following materials were prepared.

styrene 75.0 parts
n-butyl acrylate 25.0 parts
polyester resin 4.0 parts
(polyester resin having a weight-average molecular weight (Mw) of 20,000, a glass transition temperature (Tg) of 75° C. and an acid value of 8.2 mgKOH/g)
ethylene glycol distearate 14.0 parts
(ester wax obtained by esterifying ethylene glycol and stearic acid)
hydrocarbon wax (HNP-9, product of Nippon Seiro Co., Ltd.) 2.0 parts
divinylbenzene 0.5 parts A mixture having mixed the above materials was maintained at a temperature of 60° C., agitated at 500 rpm using a T. K. Homogenizing Mixer (product of Tokushu Kika Kogyo Co., Ltd.) and uniformly dissolved to prepare a polymerizable monomer composition.

Meanwhile, 850.0 parts of 0.10 mol/L—$Na_3PO_4$ aqueous solution and 8.0 parts of 10% hydrochloric acid were added to a container equipped with a high speed agitation apparatus Clearmix (product of M Technique Co., Ltd.), which was heated to 70° C. with a rotation speed set to 15,000 rpm. Then, 127.5 parts of 1.0 mol/L—$CaCl_2$ aqueous solution was added to prepare an aqueous medium containing a calcium phosphate compound.

After putting the above-described polymerizable monomer composition into the aqueous medium, 7.0 parts of t-butyl peroxypivalate, which is a polymerization initiator, was added, and granulation was performed for 10 minutes while maintaining a rotation speed of 15,000 rpm. Thereafter, the agitator was changed from the high speed agitator to a propeller-type agitator, and reaction was performed for five hours at 70° C. under reflux, before further reaction was performed for two hours with the solution temperature set to 85° C.

After completing polymerization reaction, the acquired slurry was cooled, and hydrochloric acid was added to the slurry to adjust the pH to 1.4, which was agitated for one hour to dissolve calcium phosphate salt. Thereafter, washing was performed using an amount of water three times the amount of slurry, then filtering and drying was performed, and finally, classification was performed to obtain powder adhesive particles.

Thereafter, 2.0 parts of silica particulates (number particle average diameter of primary particles: 10 nm, BET specific surface area: 170 $m^2/g$) which had been subjected to hydrophobization treatment using dimethylsilicone oil (20 wt. %) was added as additive to 100.0 parts of powder adhesive particles. Then, powder adhesive particles having silica particulates added thereto were mixed for 15 minutes at 3,000 rpm using a Mitsui Henschel Mixer (product of Mitsui Miike Chemical Engineering Machinery Co., Ltd.) to obtain powder adhesive. The weight-average particle diameter of the powder adhesive being obtained was 6.8

Example of Preparation of Printing Toner

Next, an example of a method for preparing the printing toner Ty, Tm and Tc will be described. At first, the following materials were prepared.

styrene 60.0 parts
coloring agent 6.5 parts
(C. I. Pigment Blue 15:3, product of Dainichiseika Color & Chemicals Mfg. Co., Ltd.)

The above materials were put into an attritor (product of Mitsui Miike Chemical Engineering Machinery Co., Ltd.), and zirconia particles having a diameter of 1.7 mm were used to perform dispersion for five hours by 220 rpm to obtain a pigment dispersion.

Further, the following materials were prepared.

styrene 15.0 parts
n-butyl acrylate 25.0 parts
polyester resin 4.0 parts
(polyester resin having a weight-average molecular weight (Mw) of 20,000, a glass transition temperature (Tg) of 75° C. and an acid value of 8.2 mgKOH/g)
behenyl behenate 12.0 parts
(ester wax having esterified behenic acid and behenyl alcohol)
divinylbenzene 0.5 parts The above materials were mixed and added to the pigment dispersion. The obtained mixture was maintained at a temperature of 60° C., agitated at 500 rpm using a T. K. Homogenizing Mixer (product of Tokushu Kika Kogyo Co., Ltd.), and uniformly dissolved to prepare a polymerizable monomer composition.

Meanwhile, 850.0 parts of 0.10 mol/L—$Na_3PO_4$ aqueous solution and 8.0 parts of 10% hydrochloric acid were added to a container equipped with a high speed agitation apparatus Clearmix (product of M Technique Co., Ltd.), which was heated to 70° C. with a rotation speed set to 15,000 rpm. Then, 127.5 parts of 1.0 mol/L—$CaCl_2$ aqueous solution was added to the above to prepare an aqueous medium containing a calcium phosphate compound.

After putting the above-described polymerizable monomer composition into the aqueous medium, 7.0 parts of t-butyl peroxypivalate, which is a polymerization initiator, was added, and granulation was performed for 10 minutes while maintaining a rotation speed of 15,000 rpm. Thereafter, the agitator was changed from the high speed agitator to a propeller-type agitator, reaction was performed for five hours at 70° C. under reflux, and then further reaction was performed for two hours with a solution temperature set to 85° C.

After completing polymerization reaction, the acquired slurry was cooled, and hydrochloric acid was added to the slurry to adjust the pH to 1.4, which was agitated for one hour to dissolve calcium phosphate salt. Thereafter, washing was performed using an amount of water three times the amount of slurry, then filtering and drying was performed, and finally, classification was performed to obtain toner particles.

Thereafter, 2.0 parts of silica particulates (number particle average diameter of primary particles: 10 nm, BET specific surface area: 170 $m^2/g$) having been subjected to hydrophobization treatment using dimethylsilicone oil (20 wt. %) was added as additive to 100.0 parts of toner particles. Then, toner particles having silica particulates added thereto were mixed for 15 minutes at 3,000 rpm using a Mitsui Henschel Mixer (product of Mitsui Miike Chemical Engineering Machinery Co., Ltd.) to obtain toner. The weight-average particle diameter of the obtained printing toner was 6.5 μm.

Method for Measuring Weight-Average Particle Diameter

Weight-average particle diameter of the printing toner Ty, Tm and Tc and the powder adhesive Tn were obtained by the following method. A precise particle size distribution measurement device called "Coulter Counter Multisizer 3" (Registered Trademark, product of Beckman Coulter, Inc.) that adopts an aperture electrical resistance method using a 100-μm aperture tube was used as a measurement device. A specialized software attached to the device called "Beckman Coulter Multisizer 3 Version 3.51" (product of Beckman Coulter, Inc.) was used to set measurement conditions and analyze measurement data. Number of effective measurement channels for the measurement was set to 25,000 channels.

Electrolyte solution having analytical grade sodium chloride dissolved in ion exchanged water with a concentration set to 1 wt. %, such as "ISOTON II" (product of Beckman Coulter, Inc.) can be used as the electrolyte solution used for the measurement.

Prior to performing measurement and analysis, setting of the specialized software is performed as described below. On "change standard measurement method (SOM)" screen of the specialized software, a total number of counts of a control mode is set to 50,000 particles, and the number of times of measurement is set to once, and a value obtained by using "standard particles 10.0 μm" (product of Beckman Coulter, Inc.) is set as Kd value. By clicking on "Button for measuring threshold/noise level", the threshold and the noise level are set automatically. Further, current is set to 1,600 μA, gain is set to 2, electrolyte is set to ISOTON II, and a check mark is entered in a box for "flush aperture tube after measurement". On a "set conversion from pulse to particle diameter" screen of the specialized software, a bin interval is set to logarithmic particle diameter, particle diameter bin is set to 256 particle diameter bins, and particle diameter range is set from 2 μm to 60 μm.

An actual measurement method is as described below.

(1) 200 mL of electrolyte solution is poured into a 250-mL round-bottom beaker made of glass dedicated for use in Multisizer 3, the beaker is set on a sample stand, and agitation of stirrer rod is performed in a counterclockwise direction at 24 rps. Then, using the "flushing of aperture tube" function of the specialized software, soiling and air bubbles in the aperture tubes are removed.

(2) 30 mL of electrolyte solution is poured into a 100-mL flat-bottom beaker made of glass. 0.3 mL of diluent obtained by diluting "Contaminon N" (Registered Trademark) (10 wt. % aqueous solution of neutral detergent of pH7 for washing precise measuring device composed of nonionic surfactant, anionic surfactant and organic builder, product of Wako Pure Chemical Industries, Ltd.) in ion exchanged water to three times by mass is added as dispersant.

(3) An ultrasonic dispersion device "Ultrasonic Dispersion System Tetora 150" (product of Nikkaki Bios Co., Ltd.) with an electrical output of 120 W is prepared, in which two oscillators with an oscillating frequency of 50 kHz are installed with a 180-phase difference. 3.3 L of ion exchanged water is poured into a tank of the ultrasonic dispersion device, and 2 mL of Contaminon N is added to the tank.

(4) The beaker mentioned in (2) is set to a beaker fixing hole of the ultrasonic dispersion device, and the ultrasonic dispersion device is activated. The height position of the beaker is set so that a resonant state of liquid level of the electrolyte solution within the beaker is maximized.

(5) Toner or powder adhesive is added and dispersed a little at a time to the electrolyte solution until a total amount of 10 mg is obtained while irradiating ultrasonic waves to the electrolyte solution in the beaker of (4). Then, ultrasonic wave dispersion processing is continued further for 60 seconds. During ultrasonic wave dispersion, the solution temperature in the tank is controlled to fall between 10° C. and 40° C.

(6) The electrolyte solution mentioned in (5) in which toner or powder adhesive is dispersed is dripped using a pipette to the round-bottom beaker mentioned in (1) placed on the sample stand, so that a measurement concentration of 5% is obtained. Then, measurement is performed until the number of measured particles reaches 50,000.

(7) Measurement data is analyzed using the specialized software attached to the device, and weight-average particle diameter is calculated.

Operation During Forming of Image

Figure 3:
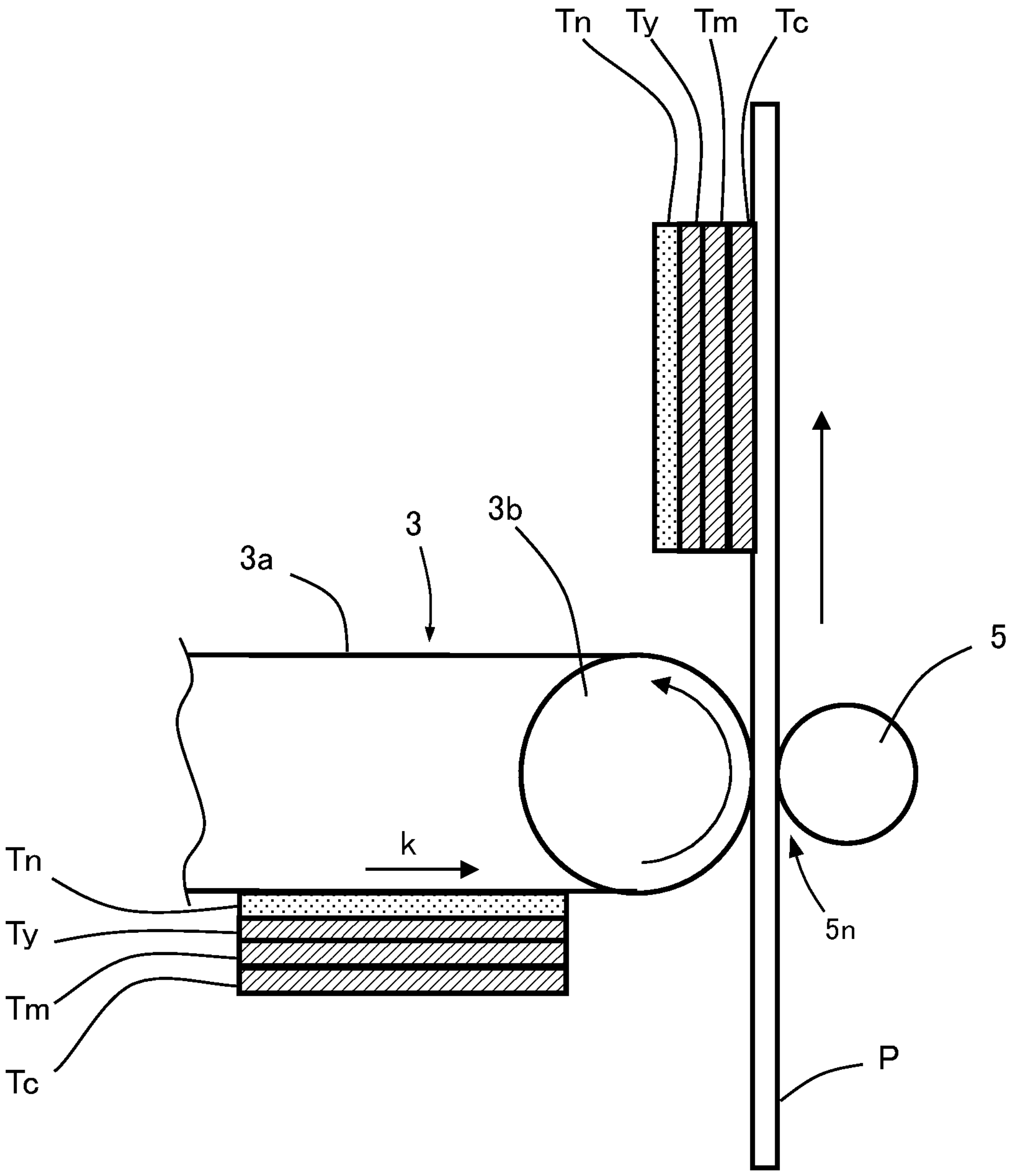
FIG. 3 is a schematic view illustrating a state of a toner image transferred to a sheet according to the first embodiment.
Figure 4A:
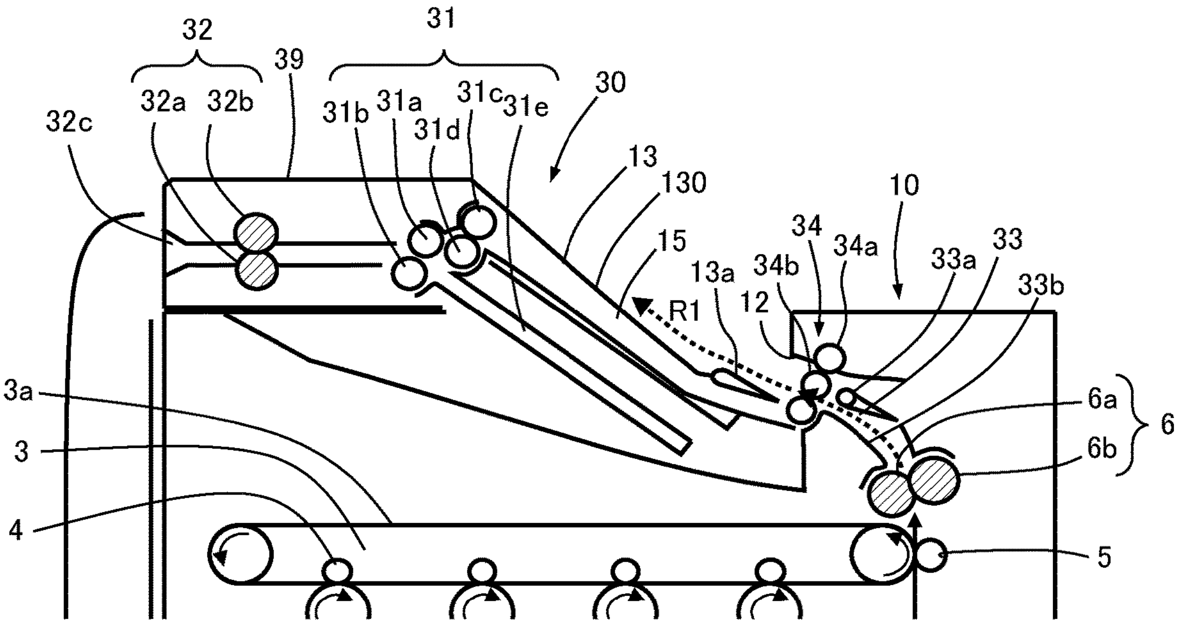
FIG. 4A is a view illustrating a conveyance route of a sheet in the image forming apparatus according to the first embodiment.
Figure 4B:
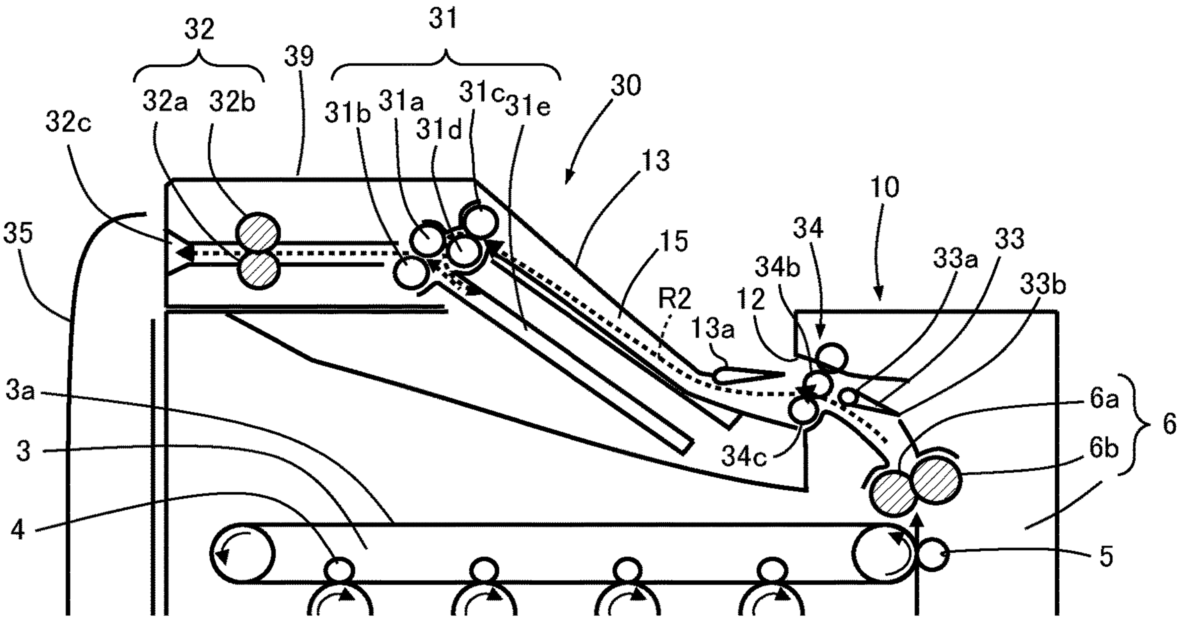
FIG. 4B is a view illustrating a conveyance route of a sheet in the image forming apparatus according to the first embodiment.
Figure 7A:
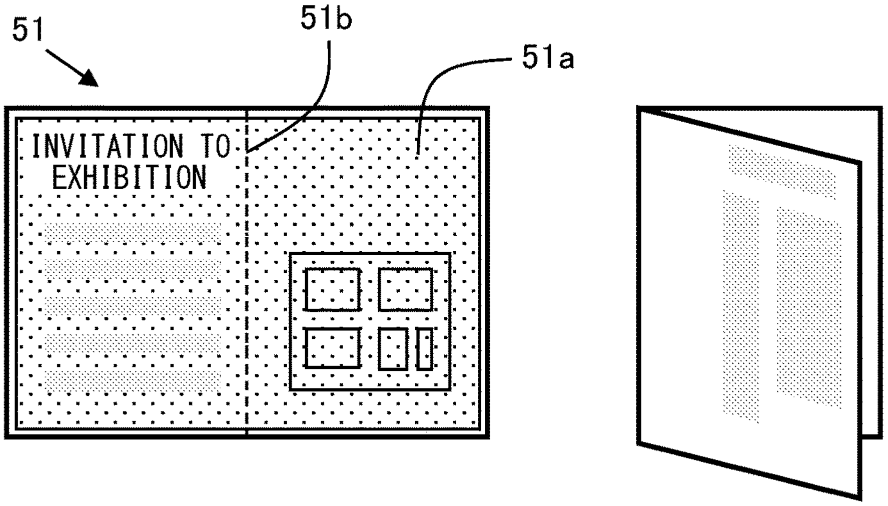
FIG. 7A is a view illustrating an example of a product output from the image forming apparatus according to the first embodiment.
Figure 7B:
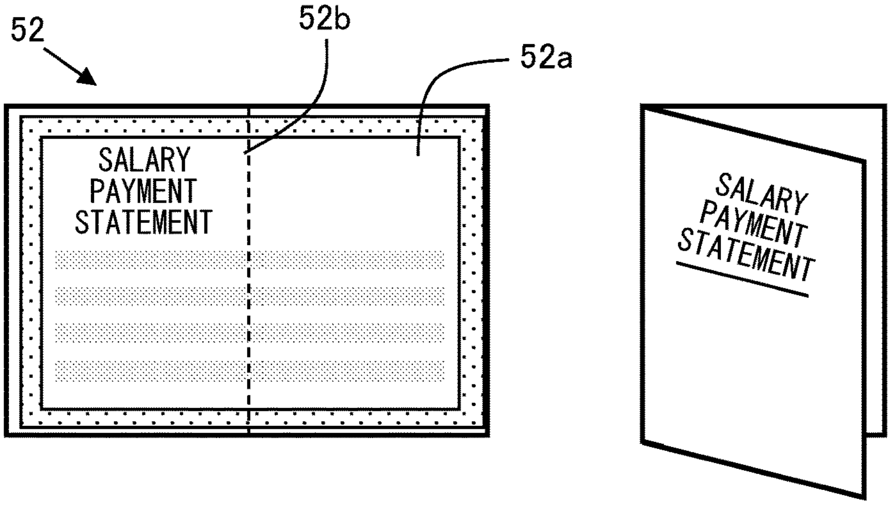
FIG. 7B is a view illustrating an example of a product output from the image forming apparatus according to the first embodiment.
Figure 7C:
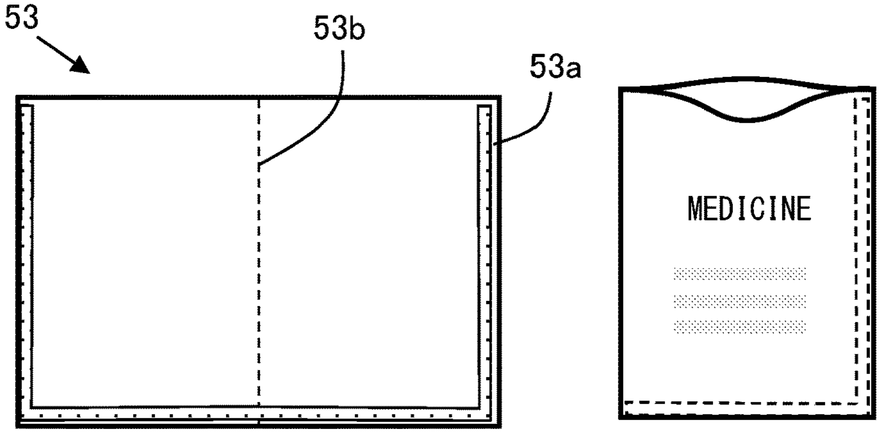
FIG. 7C is a view illustrating an example of a product output from the image forming apparatus according to the first embodiment.

Next, an image forming operation according to the image forming apparatus 1 of the present embodiment will be described with reference to FIGS. 1 to 8. FIG. 3 is a schematic view illustrating the state of the toner image transferred to the sheet P. FIGS. 4A and 4B are views illustrating a conveyance route of the sheet in the image forming apparatus 1. FIGS. 5A to 5F are views illustrating the contents of the folding process. FIGS. 7A to 7C are examples of products output by the image forming apparatus 1.

In a state where data of the image to be printed and a command to execute printing are entered to the image forming apparatus 1, a control unit of the image forming apparatus 1 starts a sequence of operations, i.e., image forming operation, in which the sheet P is conveyed, image is formed on the sheet, and if necessary, the sheet P is subjected to postprocessing by the postprocessing unit 30. In the image forming operation, at first, the sheet P is fed one at a time from the sheet cassette 8 and conveyed via the conveyance roller 8*a* toward the transfer nip 5*n*.

In parallel with the feeding of the sheet P, the processing cartridges 7*n*, 7*y*, 7*m* and 7*c* are sequentially driven, and the photosensitive drum 101 is driven to rotate in the clockwise direction (arrow w) in the drawing. In this state, a uniform charge is applied to the surface of the photosensitive drum 101 by the charge roller 102. Further, the scanner unit 2 irradiates laser light G modulated according to image data to the photosensitive drums 101 of respective processing cartridges 7*n*, 7*y*, 7*m* and 7*c*, by which electrostatic latent images are formed on the photosensitive drums 101. Next, the electrostatic latent images on the photosensitive drums 101 are developed as images of powder material by powder borne on the developing rollers 105 of the processing cartridges 7*n*, 7*y*, 7*m* and 7*c*.

The powder adhesive layer formed on the photosensitive drum 101 by developing the image using the powder adhesive Tn differs from the image of printing toner for recording an image such as a figure or a text to the sheet P, that is, normal toner image, since the former does not aim at transmitting visual information. However, the powder adhesive layer developed by an electrophotographic process for applying the powder adhesive Tn to the sheet P by a predetermined application pattern can also be considered as one type of "toner image".

The transfer belt 3*a* rotates in the counterclockwise direction (arrow k) in the drawing. The toner images formed on the respective processing cartridges 7*n*, 7*y*, 7*m* and 7*c* are primarily transferred from the respective photosensitive drums 101 to the transfer belt 3*a* by electric field formed between the photosensitive drum 101 and the primary transfer roller 4.

As illustrated in FIG. 1, the processing cartridge 7*n* using the powder adhesive Tn is positioned most upstream among the four processing cartridges in the direction of rotation of the transfer belt 3*a*. Processing cartridges 7*y*, 7*m* and 7*c* of yellow, magenta and cyan are arranged in the named order from the processing cartridge 7*n* toward the downstream side in the direction of rotation of the transfer belt 3*a*. Therefore, as illustrated in FIG. 3, if the four types of toner images are superposed on the transfer belt 3*a*, the powder adhesive Tn will be the lowermost layer, that is, the layer in contact with the transfer belt 3*a*, and printing toner of yellow (Ty), magenta (Tm) and cyan (Tc) are superposed thereon in the named order.

The toner image borne on the transfer belt 3*a* and having reached the transfer nip 5*n* is secondarily transferred to the sheet P conveyed through the main conveyance path 1*m* by the electric field formed between the secondary transfer roller 5 and the secondary transfer inner roller 3*b*. In that state, the order of the toner layer in the vertical direction is reversed. That is, from the lowermost layer, that is, the layer in contact with the sheet P, printing toner of cyan (Tc), magenta (Tm) and yellow (Ty) are superposed to the sheet P having passed the transfer nip 5*n*, and the layer of powder adhesive Tn is formed on top. Thus, the layer of the powder adhesive Tn is formed on the uppermost surface of the toner image transferred to the sheet P.

Thereafter, the sheet P is conveyed to the first fixing unit 6 and subjected to a heat fixing process. That is, the toner image on the sheet P is heated and pressed while the sheet P passes the fixing nip 6*n*, by which the printing toner Ty, Tm and Tc and the powder adhesive Tn are melted and then fixed, so that an image fixed to the sheet P is obtained.

Regardless of whether the printing is a one-side printing or duplex printing, the sheet P discharged from the apparatus body 10 is nipped by the intermediate roller 34*b* and the second sheet discharge roller 34*c*, as illustrated in FIGS. 4A and 4B, and the sheet P is either conveyed to a first route R1 or a second route R2 by the tray switch guide 13*a*.

The first route R1 illustrated in FIG. 4A is a route through which the sheet P having passed the first fixing unit 6 is discharged by the sheet discharge unit 34 to the first sheet discharge tray 13 in a normal printing mode where the postprocessing unit 30 is not used. The second route illustrated in FIG. 4B is a route through which the sheet P having passed the first fixing unit 6 is conveyed via the sheet discharge unit 34, the folding unit 31 and the second fixing unit 32 and discharged to the second sheet discharge tray 35 in a print-and-bond mode.

The intermediate path 15 is provided between the first fixing unit 6 and the folding unit 31 in the second route R2. The intermediate path 15 is a sheet conveyance path that passes the upper surface portion, i.e., top panel portion, of the image forming apparatus 1, and extends approximately in parallel with the first sheet discharge tray 13 at the lower side of the first sheet discharge tray 13. The intermediate path 15 and the first sheet discharge tray 13 are inclined upward in the vertical direction toward the folding unit 31 with respect to the horizontal direction. Therefore, an inlet port, that is, the guide roller pair 31*c* and 31*d* of the folding unit 31 described later is positioned upward in the vertical direction of an outlet port, that is, the nip between the intermediate roller 34*b* and the second sheet discharge roller 34*c*, of the apparatus body 10.

The folding unit 31 includes four rollers, which are a first guide roller 31*c*, a second guide roller 31*d*, a first folding roller 31*a* and a second folding roller 31*b*, and a drawing portion 31*e*. The first guide roller 31*c* and the second guide roller 31*d* are a guide roller pair that nips and conveys the sheet P received from a conveyance path, which is the intermediate path 15 according to the present embodiment, arranged upstream of the folding unit 31. The first folding roller 31*a* and the second folding roller 31*b* constitute a folding roller pair that folds the sheet P while conveying the sheet P.

A distance M (FIG. 1) from the second sheet discharge roller 34*c* to the first guide roller 31*c* in the sheet conveyance direction along the second route R2 is designed to be shorter than a total length L (FIG. 5A) in the conveyance direction of the sheet P prior to the folding process. In other words, a lower limit of the conveyance direction length of the sheet that can be processed by the postprocessing unit 30 is determined by the distance M from the second sheet discharge roller 34*c* to the first guide roller 31*c*. According to this configuration, the sheet P is transferred smoothly from the sheet discharge unit 34 to the guide roller pair.

Figure 5A:
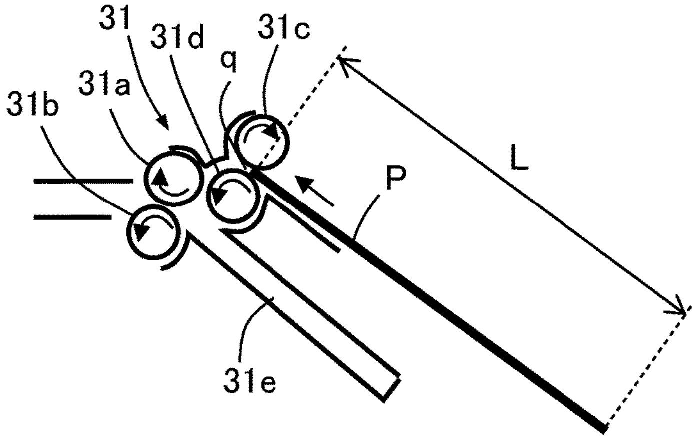
FIG. 5A is a view illustrating a folding process according to the first embodiment.
Figure 5B:
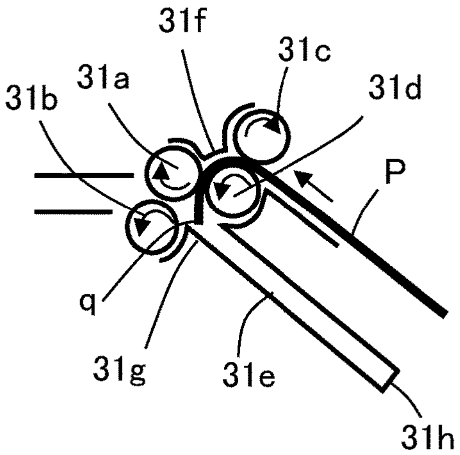
FIG. 5B is a view illustrating the folding process according to the first embodiment.

A folding process performed by the folding unit 31 will be described with reference to FIGS. 5A to 5F. When executing the folding process, the first guide roller 31*c* and the first folding roller 31*a* are rotated in the clockwise direction, and the second guide roller 31*d* and the second folding roller 31*b* are rotated in the counterclockwise direction in the drawing. At first, a leading edge q of the sheet P conveyed from the sheet discharge unit 34 is drawn into the guide roller pair 31*c* and 31*d*, as illustrated in FIG. 5A. The leading edge q of the sheet P is guided downward by a guide wall 31*f*, comes into contact with the first folding roller 31*a*, and is drawn in by the first folding roller 31*a* and the second guide roller 31*d* which are opposed to each other and comes into contact with a wall 31*g* of the drawing portion 31*e*, as illustrated in FIG. 5B.

Figure 5C:
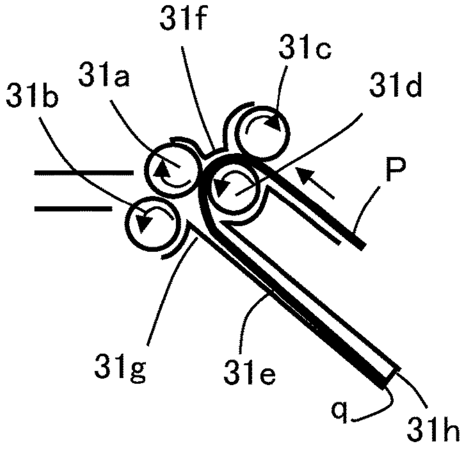
FIG. 5C is a view illustrating the folding process according to the first embodiment.

Along with the drawing of the sheet P by the guide roller pair 31*c* and 31*d*, the leading edge q moves toward the depth of the drawing portion 31*e* while sliding against the wall 31*g*. Then, as illustrated in FIG. 5C, the leading edge q abuts against an end portion 31*h* of the drawing portion 31*e*. The drawing portion 31*e* forms a space that is extended approximately parallel to the intermediate path 15 at the lower side of the intermediate path 15, as illustrated in FIG. 4A, and in the state illustrated in FIG. 5C, the sheet P is curved in a U shape by being wound around the second guide roller 31*d*.

Figure 5D:
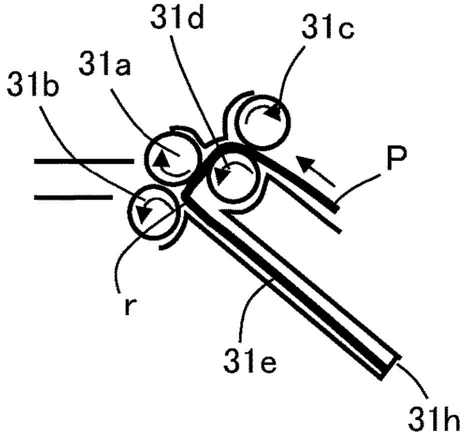
FIG. 5D is a view illustrating the folding process according to the first embodiment.
Figure 5E:
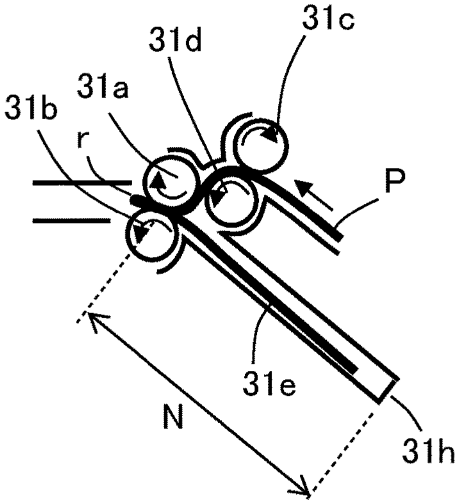
FIG. 5E is a view illustrating the folding process according to the first embodiment.
Figure 5F:
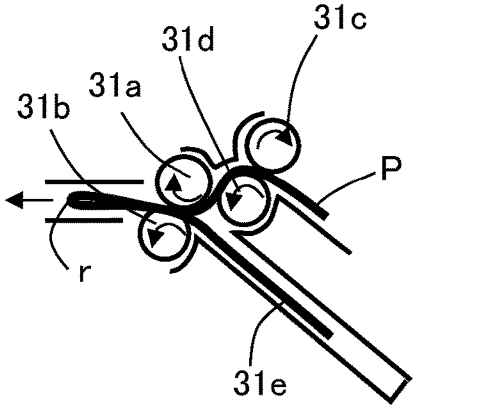
FIG. 5F is a view illustrating the folding process according to the first embodiment.

If the sheet P is drawn in further by the guide roller pair 31*c* and 31*d* from the state illustrated in FIG. 5C, a warp starts to be formed at a middle part r, as illustrated in FIG. 5D. Then, when the middle part r contacts the second folding roller 31*b*, the middle part is drawn into the nip portion of the folding roller pair 31*a* and 31*b* by frictional force received from the second folding roller 31*b*, as illustrated in FIG. 5E. Then, the sheet P in the folded state with the idle part r serving as a folding line is discharged with the middle part r positioned as the leading edge by the folding roller pair 31*a* and 31*b*, as illustrated in FIG. 5F.

A depth N of the drawing portion 31*e* (FIG. 5E), that is, the distance from the nip portion of the folding roller pair 31*a* and 31*h* to an end portion 31*h* of the drawing portion 31*e* is set to half the total length L of the sheet P. Thereby, the folding unit 31 can execute a process of folding the sheet P at half the sheet length, i.e., center fold. The position of the folding line can be changed arbitrarily by changing the depth N of the drawing portion 31*e*.

The folding unit 31 described above is an example of the folding portion, and other folding mechanisms can be adopted, such as a folding mechanism in which a folding line is formed by pressing a blade against the sheet P and pushing the sheet into the nip portion of a roller pair. The folding mechanism not only executes a two-fold folding process, but also executes a Z-shaped fold or a three-fold folding process. Since the folding unit 31 according to the present embodiment is composed of rotating rollers and the drawing portion 31*e* being fixed, the driving mechanism can be simplified compared to the folding mechanism using a blade that moves in reciprocating motion. Further, the folding unit 31 according to the present embodiment only requires to provide the drawing portion 31*e* having the depth N set to half the sheet length in addition to the four rollers, so that the postprocessing unit 30 can be downsized.

The sheet P having passed through the folding unit 31 is conveyed to the second fixing unit 32, as illustrated in FIG. 4B. The second fixing unit 32 adopts a heat-fixing configuration, similar to the first fixing unit 6. That is, the second fixing unit 32 includes a heating roller 32*b* serving as a heating member and a pressure roller 32*a* serving as a pressing member. The heating roller 32*b* is heated by a heat generating mechanism using a heating element such as a halogen lamp or a ceramic heater or adopting an induction heating system. The pressure roller 32*a* is pressed against the heating roller 32*b* by an urging member such as a spring that generates pressing force for applying pressure to the sheet P passing through the nip portion, i.e., bonding nip, between the heating roller 32*b* and the pressure roller 32*a*. A configuration has been illustrated where the roller pair serving as the rotary member pair nips and conveys the sheet, but other configurations can be adopted, such as a configuration where a heater is arranged at an inner side of a tubular film and where the sheet is nipped and conveyed by the nip portion formed between the heater and the pressure roller opposed to the heater interposing the film.

The sheet P folded by the folding unit 31 is subjected to a bonding process, that is, second heat fixing performed to an image surface to which powder adhesive has been applied, by the second fixing unit 32, and the sheet P is bonded in the folded state. That is, while the sheet P passes the bonding nip, the powder adhesive Tn on the sheet P is reheated to be softened and pressed, so that the adhesive applied on the bonding surface, that is, parts of the surface of the sheet which is opposed to each other in the folded state with the powder adhesive Tn layer interposed, is adhered closely. Then, when the powder adhesive Tn is cooled and solidified, the image surface and the opposing surface of the sheet P are bonded, i.e., press-bonded, with the powder adhesive Tn serving as the adhesive.

The sheet P having been subjected to the bonding process by the second fixing unit 32 is discharged toward a left side in the drawing through a sheet discharge port 32*c*, i.e., second sheet discharge port, provided on the casing 39 of the postprocessing unit 30, as illustrated in FIG. 4B. Then, the sheet P is stored in the second sheet discharge tray 35 provided on the left side of the apparatus body 10 (refer to FIG. 1). The image forming operation in which the sheet P is conveyed through the second route R2 is ended.

The bonding area of the sheet Pin the folded state can be varied according to the application pattern of the powder adhesive Tn on the sheet P. FIGS. 7A to 7C illustrate products, i.e., output products of the image forming apparatus, in which the application patterns of the powder adhesive Tn are varied. FIGS. 7A and 7B are examples of a product, that is, a semi-bonded product, the purpose of use of which is to be opened by a receiver. In the case of a crimped postcard 51 of FIG. 7A, the powder adhesive Tn is applied to a whole surface 51*a* of one side of a base sheet, and the sheet is folded at a center folding line 51*b* and bonded. In the case of a salary payment statement 52 illustrated in FIG. 7B, the powder adhesive Tn is applied to a whole outer circumference 52*a* of one side of the base sheet, and the sheet is folded at a center folding line 52*b* and bonded. FIG. 7C illustrates a pouch, i.e., medicine envelope, which is an example of a product, that is, a completely bonded product, the purpose of use of which is not intended to be opened by the user. In this case, the powder adhesive Tn is applied to a rectangular-shaped region 53*a* with one side open so that two sides other than a folding line 53*b* of the sheet in the folded state are bonded.

Further, the image forming apparatus 1 according to the present embodiment can perform output in a non-stop manner for all the products described as an example in FIGS. 7A to 7C, without preparing a pre-printed sheet. That is, in parallel with the operation for recording an image on one or both sides of the base sheet using printing toner, the powder adhesive can be applied according to a predetermined application pattern, and products subjected to both the folding process and bonding process can be output. For example, in order to output the products illustrated in FIGS. 7A to 7C, one side of the sheet used as the base sheet corresponds to the outer side of the product and the other side of the sheet corresponds to the inside of the product. Therefore, an image on the outer side is formed by the printing toner as the image forming operation performed to the first side in duplex printing, and an image on the inner side is formed by the printing toner, while powder adhesive is applied according to a predetermined application pattern, as the image forming operation performed to the second side.

The image formed by the image forming apparatus 1 using the printing toner can include both the format, that is, unchanged portion (i.e., invariable portion), corresponding to the case where a pre-printed sheet is used, and a variable portion such as the personal information. Therefore, as descried above, the present embodiment enables to output a product that has been bonded by the bonding process using a base sheet such as a blank sheet that is not a pre-printed sheet. However, it is also possible to use a pre-printed sheet as the recording medium and use the image forming apparatus 1 according to the present embodiment for performing the printing process for printing the variable portion and the bonding process.

Cooling of the toner image printed on the first side of the sheet will be explained. The toner image transferred to the first side is subjected to the fixing process at the first fixing unit 6, and thereafter, heated again by the first fixing unit 6 when the toner image transferred to the second side is heated and fixed. Further, when the sheet P receives the bonding process by the postprocessing unit 30, the sheet P is also heated by the second fixing unit 32. If the toner image printed on the first side is repeatedly heated as described above, the toner image may be transferred to the heating roller 32*b* when the sheet P passes through the second fixing unit 32 and the transferred toner image may adhere to another portion of the sheet or a succeeding sheet when the heating roller 32*b* rotates once.

In the present embodiment, after completing the fixing process to the first side, the sheet P is subjected to reverse conveyance by the first sheet discharge roller 34*a* and the intermediate roller 34*b* that serves as a reverse unit. In this state, rising of temperature of the sheet P is suppressed by a portion of the sheet P being exposed to the exterior of the apparatus and cooled by outside air. That is, according to the present embodiment, the sheet P partially being exposed to the exterior of the apparatus and subjected to reverse conveyance functions as a cooling portion where the sheet P is cooled. According to this configuration, the possibility of the image being transferred disadvantageously as described above can be reduced.

Storage Temperature of Powder Adhesive

In a state where the image forming apparatus 1 illustrated in FIG. 1 executes the image forming operation, the first fixing unit 6 is heated to execute the heat fixing process, and the respective processing cartridges 7*n*, 7*y*, 7*m* and 7*c* are heated by friction between the developing roller 105 and the photosensitive drum 101. Further, a power supply unit generates heat when supplying power to a power member, such as the secondary transfer roller 5 and the charge roller 102, related to the image forming operation. Further, in the case of the print-and-bond process, the second fixing unit 32 is also heated.

If the temperature of the powder adhesive Tn stored in the image forming apparatus 1 rises by the heat generated by the heat source such as the first fixing unit 6 and the second fixing unit 32, particles of the powder adhesive may be melted or aggregated, and the quality of the powder adhesive Tn may be deteriorated. The powder adhesive Tn is designed to melt easier than the printing toner Ty, Tm and Tc to exert the bonding function easily. Therefore, temperature of the powder adhesive Tn being stored should be controlled carefully. If the powder adhesive Tn is deteriorated, output of normal products by the print-and-bond process may be obstructed due to bonding failures caused, for example, by the lack of amount of application of the powder adhesive Tn.

The image forming apparatus 1 according to the present embodiment arranges the powder storage portion 104*n* storing the powder adhesive Tn lower than the first fixing unit 6 and the second fixing unit 32 with respect to the vertical direction V, as illustrated in FIG. 1. Specifically, a bottom portion 104*b* of the powder storage portion 104*n* is positioned lower than a lower end portion of the first fixing unit 6 and a lower end portion of the second fixing unit 32. In this description, the lower end portion of the fixing unit refers to a bottom surface of the casing of the fixing unit storing the heating roller and the pressure roller. If there is no member corresponding to such casing, the lower end portion of the fixing unit refers to a lower end of the heating roller serving as the heat source. More preferably, the powder storage portion 104*n* is arranged so that the whole body of the powder storage portion 104*n* is positioned lower than the lower end portion of the first fixing unit 6 and the lower end portion of the second fixing unit 32.

By arranging the powder storage portion 104*n* lower than the first fixing unit 6 and the second fixing unit 32, transmission of heat to the powder storage portion 104*n* through hot air heated by the first fixing unit 6 and the second fixing unit 32 can be reduced. Therefore, the quality of the powder adhesive Tn in the powder storage portion 104*n* can be maintained at a stable condition for a long period.

According further to the present embodiment, a configuration is adopted where the powder storage portion 104*n* storing the powder adhesive Tn is separated vertically from the first fixing unit 6 and the second fixing unit 32 by the transfer belt 3*a* of the transfer unit 3. That is, the first fixing unit 6 and the second fixing unit 32 are disposed above the transfer belt 3*a*, and the powder storage portion 104*n* is disposed below the transfer belt 3*a*. The heat transmitted from the first fixing unit 6 and the second fixing unit 32 to the powder storage portion 104*n* can be further reduced by an insulating operation of space occupied by the transfer belt 3*a*.

According to the present embodiment, as mentioned earlier, the inlet port of the folding unit 31 is positioned upward in the vertical direction than the sheet discharge unit 34 serving as the outlet port of the apparatus body 10 (FIG. 1). Further, the occupation range of the folding unit 31 is overlapped in the vertical direction V with the occupation range of the second fixing unit 32, and the sheet conveyance path from the folding unit 31 to the second fixing unit 32 extends approximately in the horizontal direction H. That is, since the second fixing unit 32 is positioned upper than the sheet discharge unit 34 according to the present configuration, the second fixing unit 32 serving as a heat source is separated upward from the powder storage portion 104*n* storing the powder adhesive Tn.

Arranging the folding unit 31 on a position upper than the sheet discharge unit 34 and inclining the first sheet discharge tray 13 and the intermediate path 15 also have the following advantages. At first, since the first sheet discharge tray 13 is inclined upward toward a downstream side in the sheet discharge direction of the sheet discharge unit 34, the configuration contributes to improving alignment of the sheets P supported on the first sheet discharge tray 13. Further, since the space below the first sheet discharge tray 13 is used as the intermediate path 15 arranged parallel to the first sheet discharge tray 13, volume efficiency of the image forming apparatus 1 is enhanced. As a criterion of inclination angle, an angle θ formed by a horizontal plane and a plane that connects a center of shaft of the second sheet discharge roller 34*c* and a center of shaft of the first guide roller 31*c* should preferably be set to 10 to 40 degrees.

Air Blow in Image Forming Apparatus

Now, a configuration for cooling an interior of the image forming apparatus 1 using a fan will be described. As illustrated in FIG. 1, at least one fan 40*a*, 40*b* or 40*c* serving as an air blow portion, the number of which in the illustrated example is three, is arranged at a rear side, i.e., depth side of the image forming unit 1*e* in the viewpoint of FIG. 1, in the apparatus body 10 of the image forming apparatus 1 according to the present embodiment.

Each fan 40*a*, 40*b* and 40*c* generates airflow, i.e., cooling air, by taking in outside air (fresh air) through an air intake port formed on the casing 19. The cooling air from the fan 40*a* passes through an air blow route, a typical example of which is shown by arrow f0, flows through the four processing cartridges 7*n*, 7*y*, 7*m* and 7*c* and the transfer belt 3*a* to cool these units before being discharged through a louver 38R serving as an air outlet port. The cooling air from the fan 40*b* passes through the air blow route, a typical example of which is shown by arrow f1, and cools the first fixing unit 6 before being discharged through the louver 38R or the first sheet discharge port 12 (arrow f2). Further, the cooling air from the fan 40*c* cools a power supply unit not shown arranged at a rear side portion of the apparatus body 10 before being discharged through the louver 38R. By cooling the respective units in the apparatus body 10 using the cooling air generated by the fans 40*a*, 40*b* and 40*c*, overheating of the respective units can be suppressed and stable image forming operation is enabled.

The air blow routes f0 and f1 that pass the powder storage portion 104*n* storing the powder adhesive Tn and the first fixing unit 6 within the apparatus body 10 are generally directed from the left side to the right side in FIG. 1. The reason for this is that the fans 40*a* and 40*b* are arranged on the left side, and the louver 38R and the first sheet discharge port 12 are arranged on the right side with respect to the horizontal direction of the drawing. The powder storage portion 104*n* is positioned upstream of the first fixing unit 6 with respect to the direction from the left side to the right side in FIG. 1. Therefore, the rising of temperature of the powder adhesive Tn stored in the powder storage portion 104*n* caused by the air heated by the first fixing unit 6 being blown onto the powder storage portion 104*n* can be prevented, and the configuration contributes to maintaining the quality of the powder adhesive Tn.

Further, the powder storage portion 104*n* of the powder adhesive Tn is positioned upstream of the powder storage portions 104*y*, 104*m* and 104*c* storing printing toner Ty, Tm and Tc with respect to the direction from left to right in FIG. 1. That is, the powder storage portion 104*n* of the powder adhesive Tn is positioned closer to the fan 40*b* than the powder storage portions 104*y*, 104*m* and 104*c* storing printing toner Ty, Tm and Tc. According to this configuration, the powder adhesive Tn which melts easier than the printing toner Ty, Tm and Tc and which is sensitive to temperature can be cooled efficiently, and the quality of the powder adhesive Tn can be maintained according to this configuration.

According further to the configuration of the first embodiment, the powder storage portion 104*n* storing the powder adhesive Tn is stored in the casing 19, i.e., first casing, of the apparatus body 10, while the second fixing unit 32 is stored in the casing 39, i.e., second casing, of the postprocessing unit 30. Therefore, the air being heated by the second fixing unit 32 does not reach the powder storage portion 104*n* easily, and rising of temperature of the powder adhesive Tn by the heat of the second fixing unit 32 can be suppressed.

According to the present embodiment, the air having cooled the powder storage portion 104*n* is mainly discharged through the louver 38R serving as a first air outlet port, while as at least a portion of the air having cooled the first fixing unit 6 is discharged through the first sheet discharge port 12 serving as a second air outlet port. That is, the air blow route that passes the powder storage portion 104*n* storing the powder adhesive Tn is at least partially separated from the air blow route that passes the first fixing unit 6. Even according to this configuration, the air heated by the first fixing unit 6 is not easily blown to the powder storage portion 104*n* and rising of temperature of the powder adhesive Tn is suppressed. A partition panel for separating the image forming unit 1*e* and the first fixing unit 6 can be provided in the interior of the casing 19, to thereby more clearly divide the air blow route that passes the powder storage portion 104*n* from the air blow route that passes the first fixing unit 6.

Second Embodiment

Figure 9:
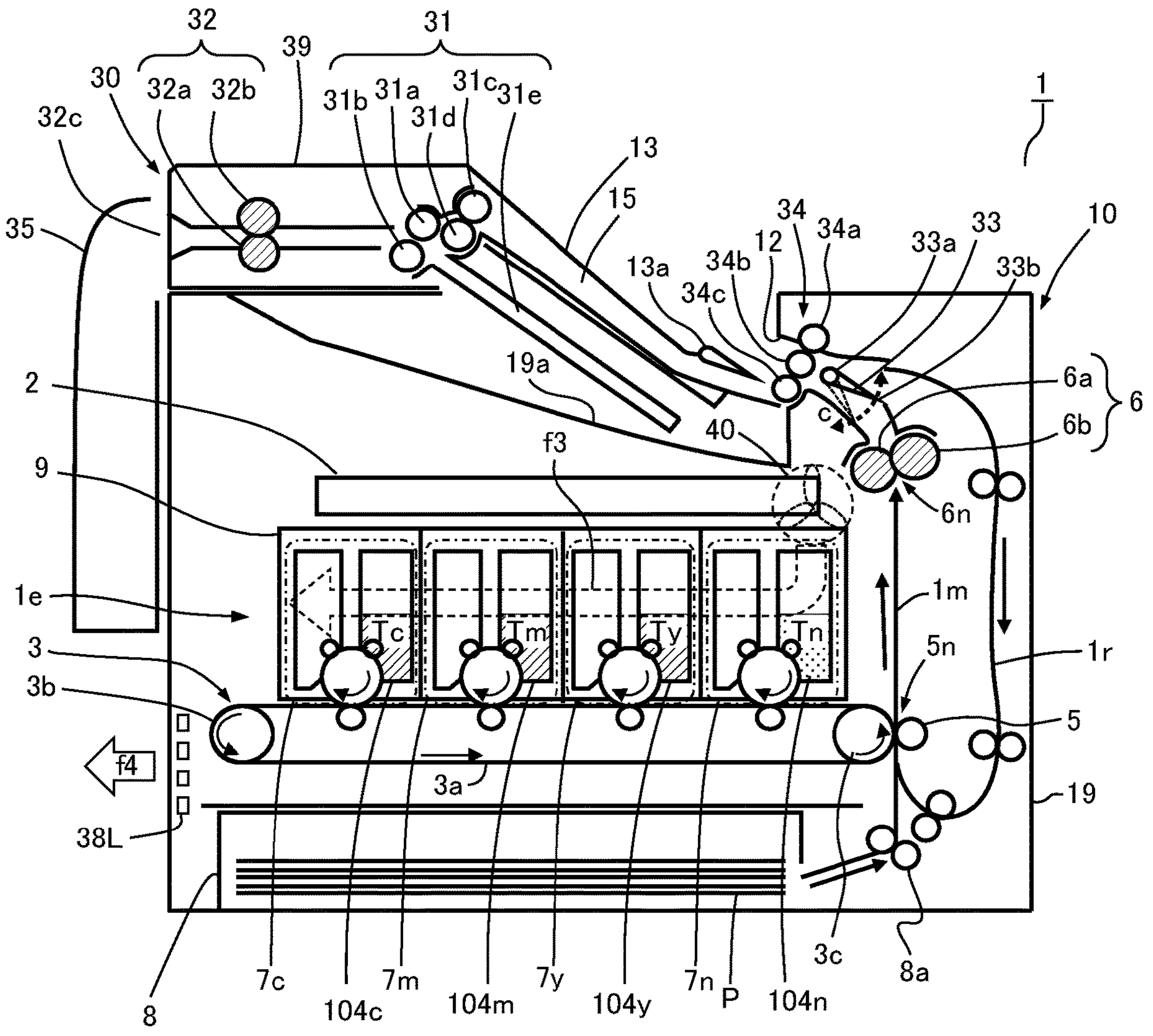
FIG. 9 is a schematic drawing of an image forming apparatus according to a second embodiment.

Next, a second embodiment will be described with reference to FIG. 9. The elements denoted with the same reference numbers as the first embodiment have a common function as the first embodiment, and descriptions thereof are omitted.

The present embodiment differs from the first embodiment in that the transfer unit 3 is arranged lower than the processing cartridges 7*n*, 7*y*, 7*m* and 7*c*. The processing cartridge 7*n* using the powder adhesive Tn is positioned on the rightmost side in the drawing among the four processing cartridges, and processing cartridges 7*y*, 7*m* and 7*c* are arranged in the named order toward the left side. The positional relationship regarding the upstream/downstream direction of cartridges with respect to the direction of rotation of the transfer belt 3*a* is the same as the first embodiment (FIG. 1). Therefore, as described with reference to FIG. 3, in the case of performing printing and bonding, an image of powder material of which the uppermost layer is the powder adhesive Tn is formed on the sheet P.

Even according to the present embodiment, the powder storage portion 104*n* storing the powder adhesive Tn is arranged on a position lower than the first fixing unit 6 and the second fixing unit 32 with respect to the vertical direction. Therefore, similar to the first embodiment, deterioration of the powder adhesive Tn caused by rising of temperature can be suppressed.

According to the present embodiment, a fan 40 serving as an air blow portion is arranged at the rear side of the apparatus body 10. The cooling air from the fan 40 passes the air blow route, a typical example of which is shown by arrow f3. The cooling air cools the four processing cartridges 7*n*, 7*y*, 7*m* and 7*c*, the transfer belt 3*a* and the power supply unit not shown before being discharged through a louver 38L disposed on a left side portion of the casing 19 (arrow f4). Similar to the first embodiment, the powder storage portion 104*n* storing the powder adhesive Tn is arranged upstream of the powder storage portions 104*y*, 104*m* and 104*c* storing the printing toner Ty, Tm and Tc along the air blow route of the fan 40, so that the powder adhesive Tn can be cooled efficiently. Further, since the first fixing unit 6 is arranged at a distant position from a shortest route from the fan 40 to the powder storage portion 104*n*, the air heated by the first fixing unit 6 will not easy reach the powder storage portion 104*n*.

Modified Example

The configuration of the invention is not limited to the example configurations illustrated in the first and second embodiments, and any configuration is preferable as long as the air heated by cooling the heat source of the image forming apparatus 1 does not easily reach the powder storage portion 104*n* storing the powder adhesive Tn. For example, if the second fixing unit 32 is arranged in the casing of the apparatus body 10 according to the configuration, the second fixing unit 32 should preferably be arranged downstream of the powder storage portion 104*n* in the air blow route that passes the powder storage portion 104*n*. That is, with respect to the direction from the fan 40 via the powder storage portion 104*n* to the louver 38L, at least one of the fixing portion, the bonding portion and the powder storage portions 104*y*, 104*m* and 104*c* should preferably be arranged downstream of the powder storage portion 104*n*. The direction that passes the powder storage portion 104*n* toward the air outlet port refers, for example, to a direction of airflow that is directed from the powder storage portion 104*n* toward the louver 38L via a shortest route.

Further, as described in the first embodiment, it is effective to divide the air blow route that passes the powder storage portion 104*n* from the air blow route that passes the heat source of the image forming apparatus 1. In other words, it is preferable to independently provide a first air outlet port that discharges the airflow from the fan 40 that flows while cooling the powder storage portion 104*n* to the exterior of the casing and a second air outlet port that discharges the airflow from the air blow unit that flows while cooling at least one of the fixing portion, the bonding portion and powder storage portions 104*y*, 104*m* and 104*c* to the exterior of the casing.

Third Embodiment

Figure 10:
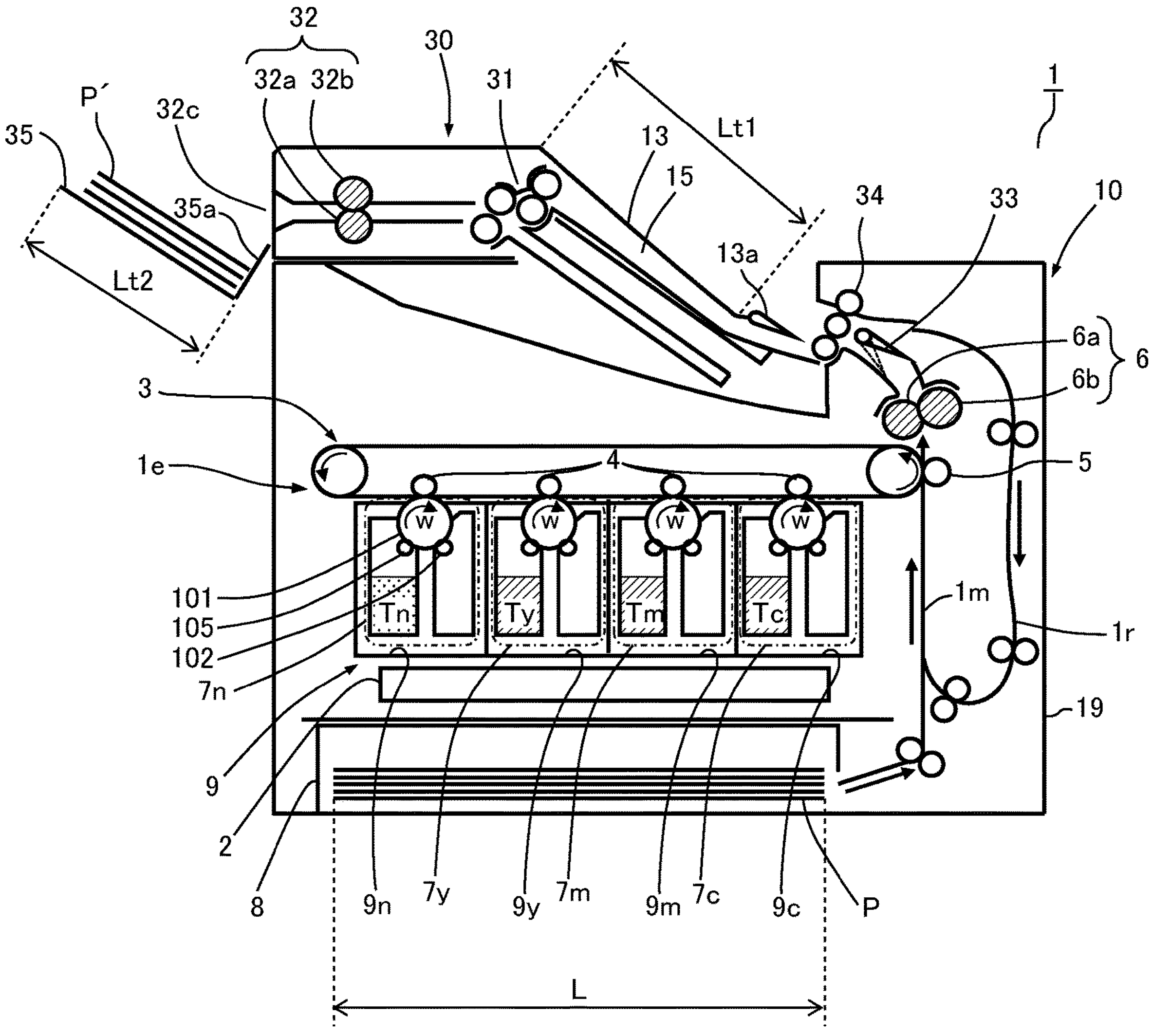
FIG. 10 is a schematic drawing of an image forming apparatus according to a third embodiment.
Figure 11:
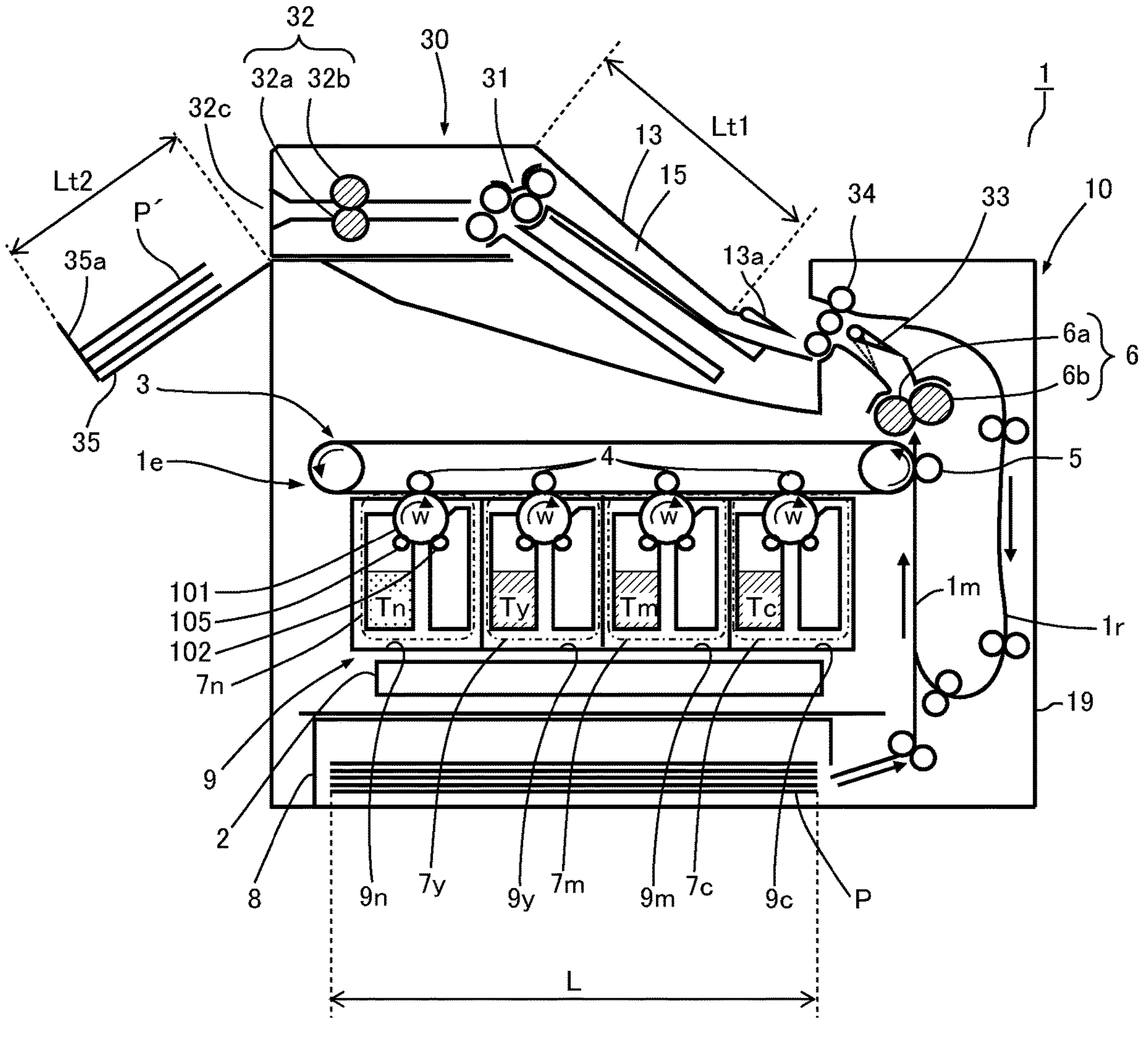
FIG. 11 is a schematic drawing of the image forming apparatus according to the third embodiment.

Next, a third embodiment will be described with reference to FIGS. 10 and 11. The elements denoted with the same reference numbers as the first embodiment are provided with the same functions as those described in the first embodiment, and descriptions thereof are omitted.

The configuration of the second sheet discharge tray 35 according to the present embodiment differs from the first embodiment. According to the configuration example of FIG. 10, the second sheet discharge tray 35 is inclined upward toward a downstream side in the sheet discharge direction. Meanwhile, according to the configuration example of FIG. 11, the second sheet discharge tray 35 is inclined downward toward the downstream side in the sheet discharge direction. A length Lt2 of the second sheet discharge tray 35 in the sheet conveyance direction is shorter than a length Lt1 of the sheet discharge tray in the apparatus body, i.e., length of the first sheet discharge tray 13, in the sheet conveyance direction. This is because the second sheet discharge tray 35 receives discharge of a sheet P' serving as a product whose length is shortened from the original sheet P, for example, half the length in the case of a two-fold, since it has been subjected to the folding process.

Further, the length Lt2 of the second sheet discharge tray 35 in the sheet conveyance direction is set shorter than the length L of the sheet P. That is, the length Lt2 of the second sheet discharge tray 35 is shorter than the length of a sheet P having a maximum length in the sheet conveyance direction, i.e., maximum sheet length, that can be subjected to the folding process and the bonding process in the image forming apparatus 1. In other words, the length Lt2 of the sheet discharge tray, i.e., the second sheet discharge tray 35 serving as a second tray, to which the sheet P serving as the printed-and-bonded product is discharged is shorter than the maximum sheet length, and preferably shorter than the length Lt1 of the other sheet discharge tray, i.e., first sheet discharge tray 13 serving as a first tray, to which the sheet P not subjected to the fold-and-bond process is discharged. This is because the second sheet discharge tray 35 receives discharge of the sheet P' serving as the product to which the folding process has been performed and that has a length shorter than the maximum sheet length in the sheet conveyance direction.

The above-described configuration enables the image forming apparatus 1 to be downsized. Further, by arranging the second sheet discharge tray 35 in an inclined manner, a product P' having been subjected to fold-and-bond processes and discharged from the apparatus is supported in an abutted manner against the abutment portion 35*a* due to its own weight, so that the operability of the user when taking out the sheet P' processed into a product is enhanced. The abutment portion 35*a* is disposed either upstream (in the case of FIG. 10) or downstream (in the case of FIG. 11) in the sheet conveyance direction with respect to the supporting surface of the second sheet discharge tray 35 in accordance with the inclination of the second sheet discharge tray 35.

Other Embodiments

The examples described in the first, second and third embodiments mentioned above adopt a configuration where the powder storage portion 104*n* storing the powder adhesive Tn is disposed as a part of the processing cartridge 7*n* that can be detachably attached to the image forming apparatus. Alternatively, a configuration can be adopted where a toner cartridge unit or a toner bottle unit including the powder storage portion 104*n* is detachably attached to the image forming apparatus independently from the process cartridge. Further, a configuration can be adopted where the powder storage portion 104*n* is assembled to the image forming apparatus, and the powder adhesive Tn is replenished from the exterior. In any case, the configuration regarding the powder storage portion 104*n* described in the first, second and third embodiments is applicable.

Further, in place of the configuration where the postprocessing unit 30 is attached as an optional unit to the apparatus body 10 of the image forming apparatus, a configuration can be adopted where respective functions of the postprocessing unit 30 are integrally assembled to the apparatus body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-233018, filed on Dec. 24, 2019, and 2020-129964, filed on Jul. 31, 2020, which are hereby incorporated by reference herein in their entirety.

What is claimed is:

1. An image forming apparatus comprising:

a first unit including (i) a first toner storage portion configured to store printing toner, (ii) a first photosensitive drum configured to bear a toner image which is formed using the printing toner, (iii) a second powder adhesive storage portion configured to store powder adhesive, (iv) a second photosensitive drum configured to bear a pattern of the powder adhesive, (v) an intermediate transfer belt arranged above the first toner storage portion, the first photosensitive drum, the second powder adhesive storage portion, and the second photosensitive drum, and onto which the toner image and the pattern of the powder adhesive are transferred respectively from the first photosensitive drum and the second photosensitive drum, (vi) a first toner image fixing portion configured to heat the toner image having been transferred from the intermediate transfer belt onto a sheet to fix the toner image to the sheet, and (vii) a first casing in which the first toner storage portion, the first photosensitive drum, the second powder adhesive storage portion, the second photosensitive drum, the intermediate transfer belt, and the first toner image fixing portion are housed; and a second unit including a second powder adhesive fixing portion configured to heat the sheet to which the toner image is fixed by the first toner image fixing portion to fix the pattern of the powder adhesive while bonding the sheet with the powder adhesive, and a second casing in which the second powder adhesive fixing portion is housed, wherein the second casing is arranged above the first casing in a vertical direction, wherein the first unit includes a first tray to which a sheet not passing the second powder adhesive fixing portion is discharged, wherein the second unit includes a second tray to which a sheet having passed the second powder adhesive fixing portion is discharged, and wherein the first tray and the second tray are arranged at a position above the first toner storage portion, the first photosensitive drum, the second powder adhesive storage portion, and the second photosensitive drum.

2. The image forming apparatus according to claim 1, wherein the first unit further includes a sheet storage portion arranged below the first toner storage portion, the first photosensitive drum, the second powder adhesive storage portion, and the second photosensitive drum and configured to store a sheet;

a feeder configured to feed the sheet stored in the sheet storage portion toward a first side in a horizontal direction;

a conveyor configured to convey the sheet having passed the first toner image fixing portion toward a second side opposite to the first side in the horizontal direction, wherein the first toner image fixing portion is arranged on a sheet conveyance route that extends upward to the conveyor from the feeder, and wherein the second powder adhesive fixing portion is arranged on a sheet conveyance route that extends from the conveyor toward the second side opposite to the first side in the horizontal direction.

3. The image forming apparatus according to claim 1, wherein the second powder adhesive fixing portion is arranged within an occupation area of the first casing when viewed in the vertical direction.

4. The image forming apparatus according to claim 1, wherein a length of the second tray in a sheet conveyance direction is shorter than a length of the first tray in the sheet conveyance direction.

5. The image forming apparatus according to claim 4, wherein the length of the second tray in the sheet conveyance direction is shorter than a maximum length among sheet lengths in the sheet conveyance direction of sheets that can be processed by the second powder adhesive fixing portion.

6. The image forming apparatus according to claim 1, wherein a length of the second tray in a sheet conveyance direction is shorter than a maximum length among sheet lengths in the sheet conveyance direction of sheets that can be processed by the second powder adhesive fixing portion.

7. The image forming apparatus according to claim 1, wherein the first unit includes a sheet cooling portion configured to cool the sheet heated by the first toner image fixing portion, and wherein the sheet cooling portion is configured to cool the sheet after the toner image is transferred on a first side of the sheet and before the pattern of the powder adhesive is transferred on a second side opposite to the first side of the sheet.

8. The image forming apparatus according to claim 7, wherein the sheet cooling portion includes a sheet reverse unit configured to reverse the sheet after the toner image is transferred on the first side of the sheet and before the pattern of the powder adhesive is transferred on the second side of the sheet, and wherein the sheet reverse unit is configured to cool the sheet by exposing a portion of the sheet to an exterior of the image forming apparatus while reversing a conveyance direction of the sheet.

9. The image forming apparatus according to claim 1, wherein with respect to the vertical direction, a bottom portion of the second powder adhesive storage portion is positioned lower than a lower end portion of the first toner image fixing portion and a lower end portion of the second powder adhesive fixing portion.

10. The image forming apparatus according to claim 1, wherein with respect to the vertical direction, an entirety of the second powder adhesive storage portion is positioned lower than a lower end portion of the first toner image fixing portion and a lower end portion of the second powder adhesive fixing portion.

11. The image forming apparatus according to claim 1, wherein when viewed in a main scanning direction of the first photosensitive drum, a distance from the second powder adhesive storage portion to the first toner image fixing portion with respect to a horizontal direction is greater than a distance from the first toner storage portion to the first toner image fixing portion with respect to the horizontal direction.

12. The image forming apparatus according to claim 1, wherein the first unit includes an air blower configured to take in air from outside of the first casing and blow the air, and an air outlet port configured to discharge an airflow generated by the air blower to an exterior of the first casing, wherein with respect to a direction from the air blower via the second powder adhesive storage portion toward the air outlet port, at least one of the first toner image fixing portion, the second powder adhesive fixing portion and the first toner storage portion is arranged downstream of the second powder adhesive storage portion.

13. The image forming apparatus according to claim 1, wherein the first unit includes an air blower configured to take in air from outside of the first casing and blow the air, a first air outlet port configured to discharge an airflow generated by the air blower to an exterior of the first casing, and a second air outlet port configured to discharge an airflow generated by the air blower to the exterior of the casing and cooling at least one of the first toner image fixing portion, the second powder adhesive fixing portion and the first toner storage portion.

* * * * *